(12) United States Patent
Wu et al.

(10) Patent No.: US 12,219,406 B2
(45) Date of Patent: Feb. 4, 2025

(54) COMMUNICATION METHOD AND APPARATUS

(71) Applicant: Huawei Technologies Co., Ltd., Shenzhen (CN)

(72) Inventors: Yizhuang Wu, Beijing (CN); Wanqiang Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 607 days.

(21) Appl. No.: 17/362,245

(22) Filed: Jun. 29, 2021

(65) Prior Publication Data

US 2021/0329504 A1   Oct. 21, 2021

Related U.S. Application Data

(63) Continuation of application No. PCT/CN2019/128476, filed on Dec. 25, 2019.

(30) Foreign Application Priority Data

Dec. 29, 2018   (CN) .......................... 201811646628.3

(51) Int. Cl.
*H04W 36/00* (2009.01)
*H04W 4/50* (2018.01)
(Continued)

(52) U.S. Cl.
CPC ......... *H04W 36/0033* (2013.01); *H04W 4/50* (2018.02); *H04W 4/60* (2018.02);
(Continued)

(58) Field of Classification Search
None
See application file for complete search history.

(56) References Cited

U.S. PATENT DOCUMENTS

2013/0262576 A1   10/2013  Foti
2021/0385642 A1*  12/2021  Di Girolamo .......... H04W 8/18

FOREIGN PATENT DOCUMENTS

CN    103384380 A    11/2013
CN    106982425 A    7/2017
(Continued)

OTHER PUBLICATIONS

"Editorial corrections and alignment," SA WG2 Meeting #123, S2-176988 (was S2-17xxxx), Ljubljana, Slovenia, pp. 1-151, 3rd Generation Partnership Project, Valbonne, France (Oct. 23-27, 2017).

(Continued)

*Primary Examiner* — Scott M Sciacca
(74) *Attorney, Agent, or Firm* — Leydig, Voit & Mayer, Ltd.

(57) ABSTRACT

This application provides a communication method and apparatus. A first mobility management function entity may receive event information from a unified data management function entity, where the event information indicates a first-type terminal event. Therefore, when a terminal apparatus is reachable, the first mobility management function entity may send, based on the event information, a terminal event report to an application function entity that subscribes to the first-type terminal event, thereby improving pertinence of sending the terminal event report.

15 Claims, 19 Drawing Sheets

(51) Int. Cl.
*H04W 4/60* (2018.01)
*H04W 8/08* (2009.01)
*H04W 36/14* (2009.01)

(52) U.S. Cl.
CPC .......... *H04W 8/08* (2013.01); *H04W 36/0011* (2013.01); *H04W 36/144* (2023.05)

(56) References Cited

FOREIGN PATENT DOCUMENTS

CN           108696861 A     10/2018
WO     WO-2020098622 A1 *    5/2020  ............. H04L 51/00

OTHER PUBLICATIONS

ZTE, "Update of Solution 39: UE availability after DDN failure for multiple AFs," SA WG2 Meeting #129, Dongguan, China, S2-1811458, total 9 pages, 3rd Generation Partnership Project, Valbonne, France (Oct. 14-20, 2018).

Huawei, HiSilicon, "Solution for KI3: UE availability after DDN failure for multiple Afs," SA WG2 Meeting #128, Vilnius, Lithuania, S2-187183, total 6 pages, 3rd Generation Partnership Project, Valbonne, France (Jul. 2-6, 2018).

Huawei, HiSilicon, "Solution for KI3: Ue availability after DDN failure for multiple Afs," Sa WG2 Meeting #128, Vilnius, Lithuania, S2-186735, total 6 p. 3rd Generation Partnership Project, Valbonne, France (Jul. 2-6, 2018).

* cited by examiner

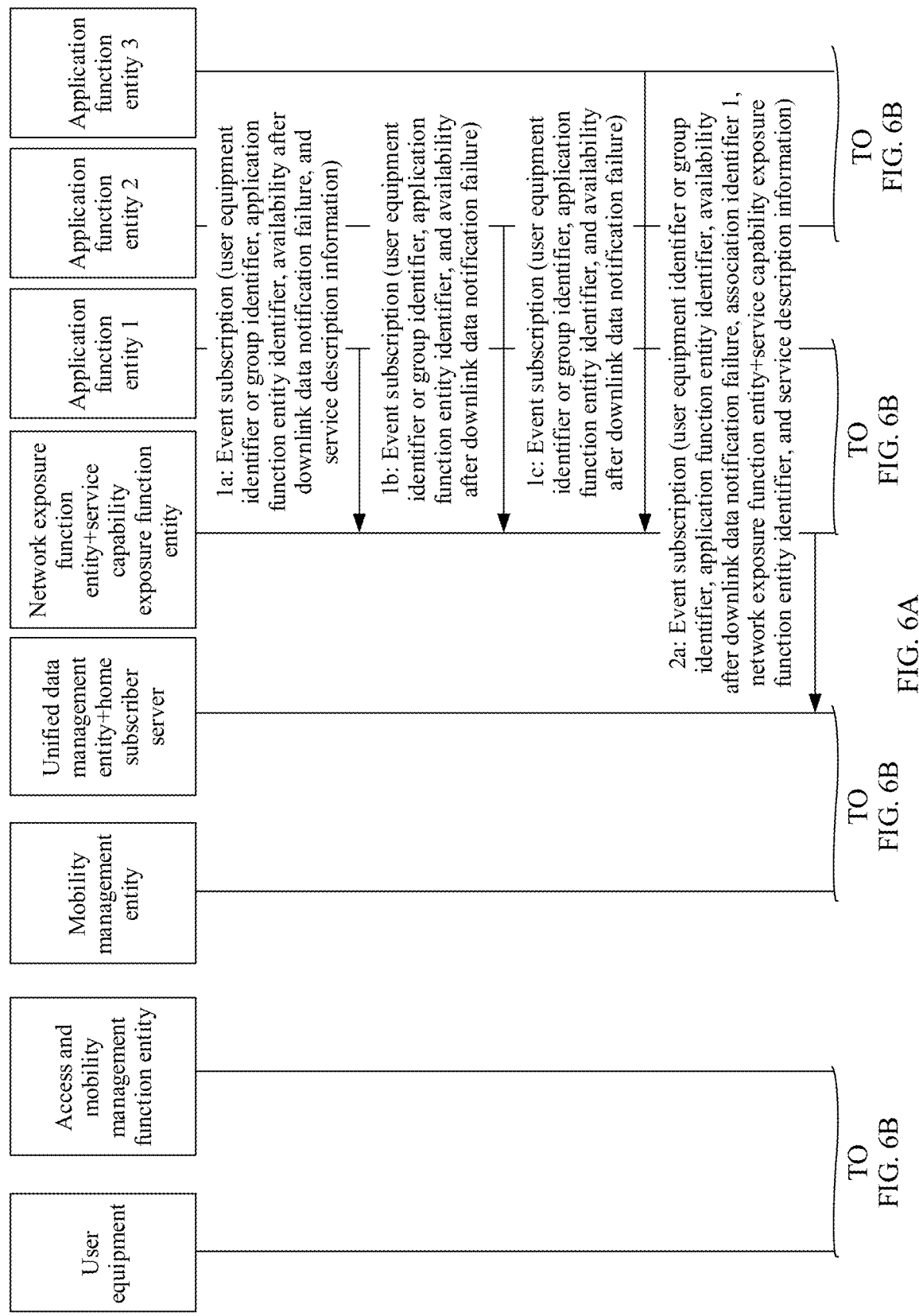

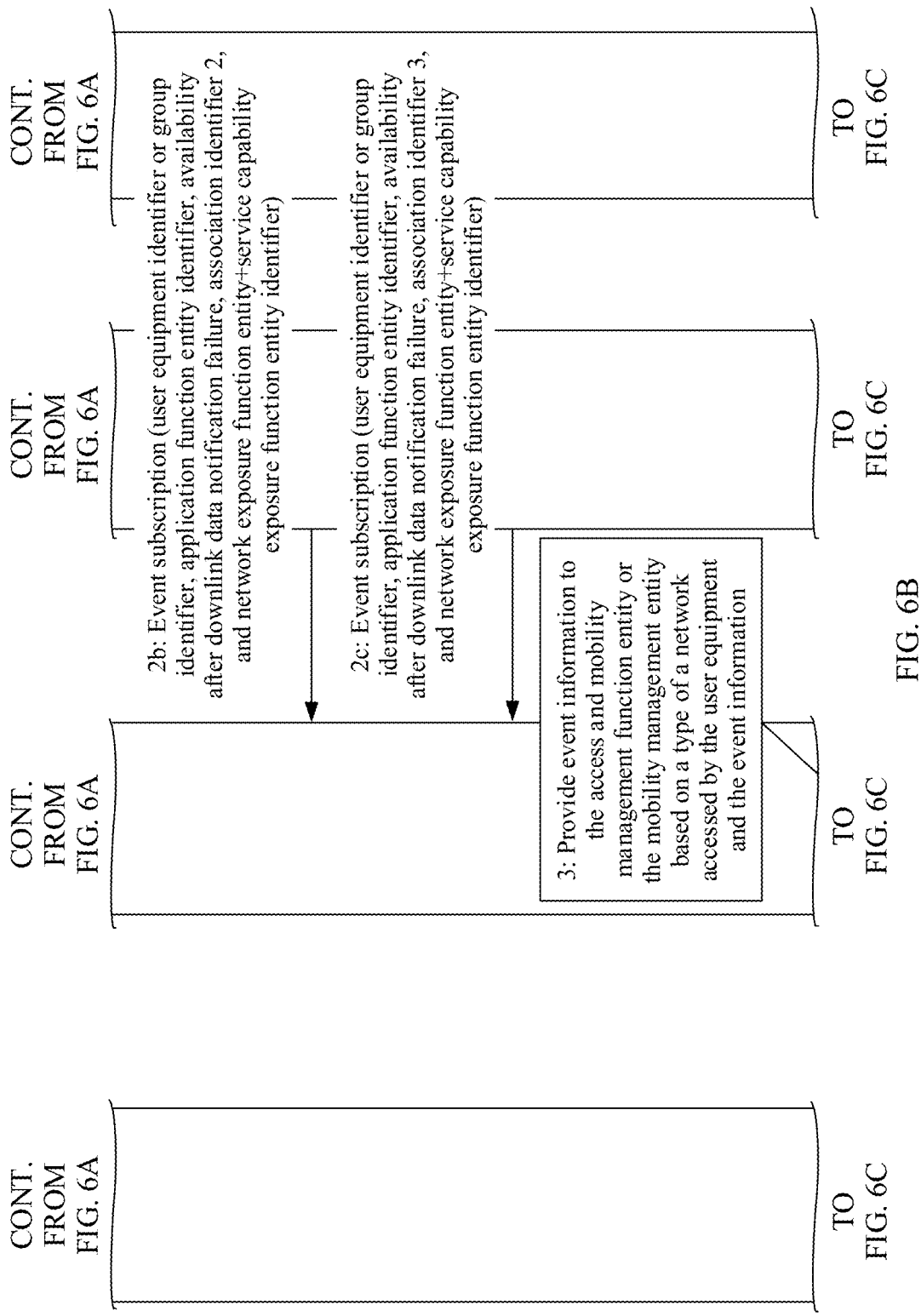

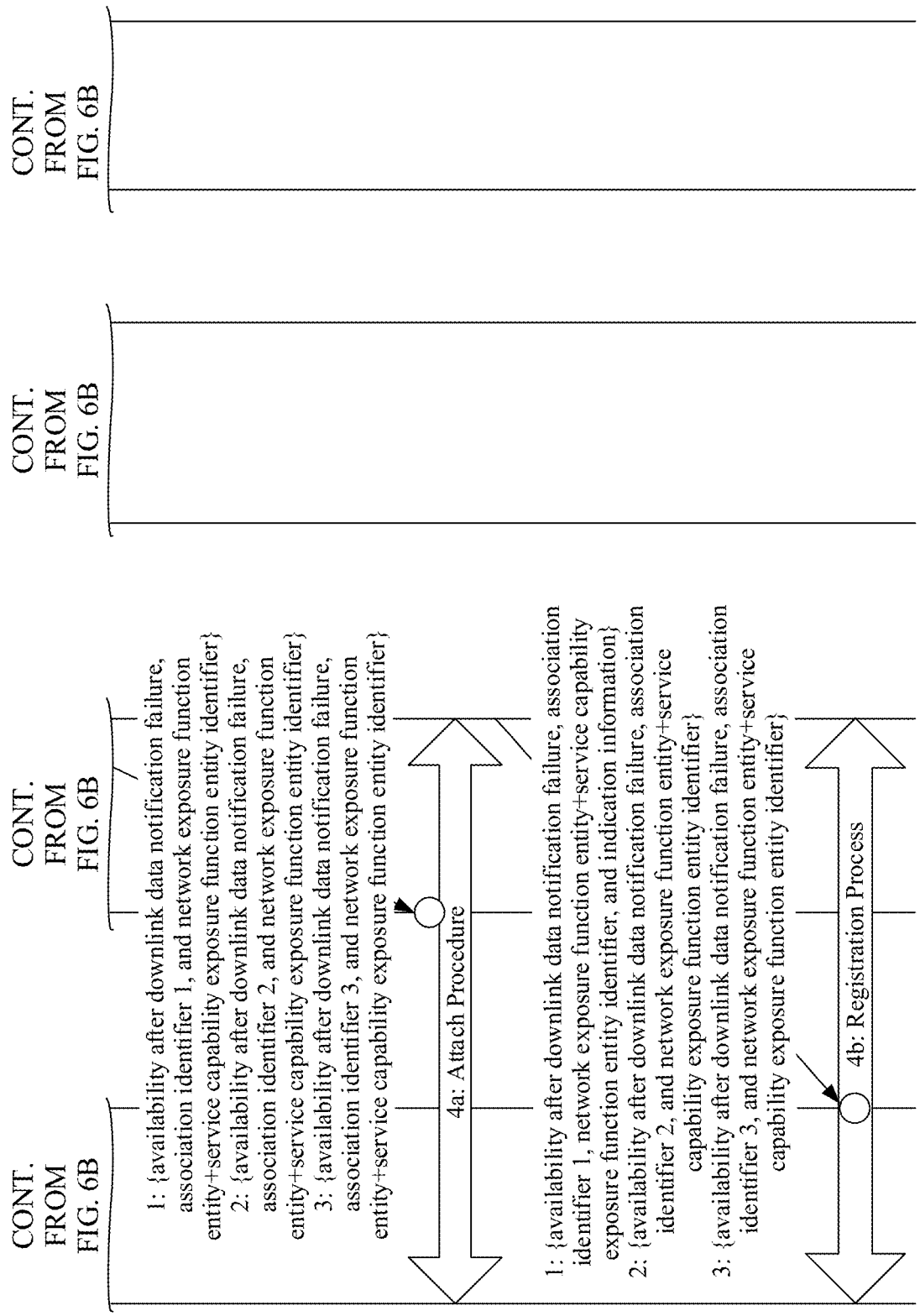

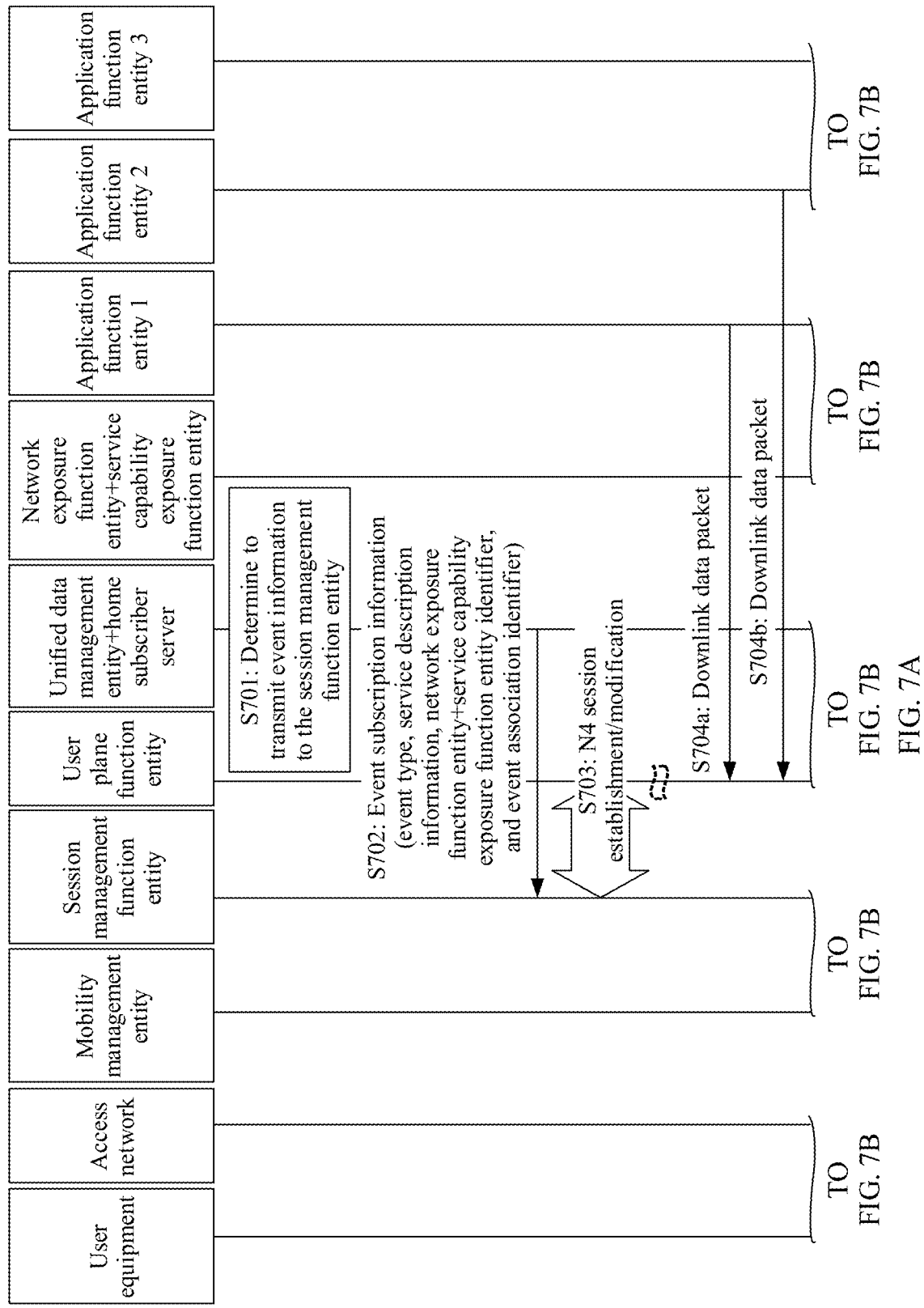

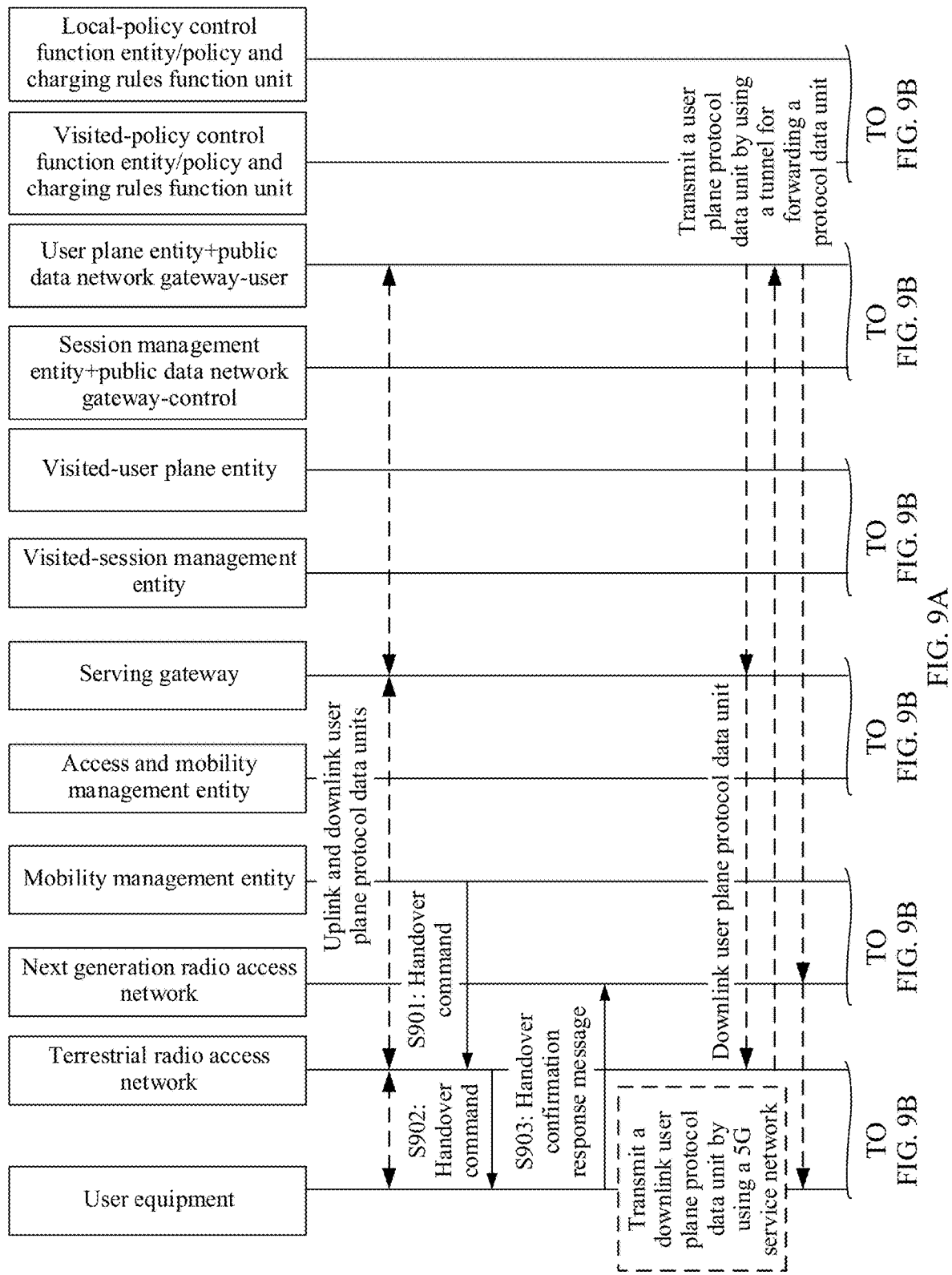

FIG. 10C

COMMUNICATION METHOD AND APPARATUS

CROSS-REFERENCE TO RELATED APPLICATIONS

This application is a continuation of International Application No. PCT/CN2019/128476, filed on Dec. 25, 2019, which claims priority to Chinese Patent Application No. 201811646628.3, filed on Dec. 29, 2018. The disclosures of the aforementioned applications are hereby incorporated by reference in their entireties.

TECHNICAL FIELD

Embodiments of this application relate to the field of communication technologies, and in particular, to a communication method and apparatus.

BACKGROUND

FIG. 1 is a schematic diagram of a non-roaming architecture of an existing evolved packet system (EPS) network. To support a service capability server/application server (SCS/AS) installed with a third-party application (such as a machine type application) in using the EPS network, the existing network architecture is enhanced. A service capability exposure function (SCEF) network element is introduced. FIG. 2 is a schematic architectural diagram of interfaces in a 3rd generation partnership project (3GPP) EPS network architecture exposed by an SCEF. The SCEF provides, to the SCS/AS, services and capabilities that are provided through secure 3GPP network interfaces.

Machine type services include a latency-insensitive service, that is, a high latency service. Based on the foregoing capability exposure architecture, to support high latency service communication, monitoring the event "terminal availability notification after downlink data notification (DDN) failure (availability after DDN failure)" is defined. To be specific, the SCS/AS may subscribe to the event "availability after DDN failure" from the 3GPP EPS network through the SCEF. When the SCS/AS sends a data packet to a terminal through the EPS network, if the terminal is in an unavailable state, the EPS network activates the event "availability after DDN failure" to monitor a terminal status. When the terminal enters an available state, the network reports the available state of the terminal to the SCS/AS through the SCEF, so that the SCS/AS resends data to the terminal.

In a 4th generation (4G) mobile communications system architecture, both sessions and mobility are controlled by a mobility management entity (MME). When a DDN message sent by a serving gateway (SGW) is received, the MME directly activates a monitoring event when the terminal is in the unavailable state, for example, the MME initiates paging for the terminal but does not receive a response, or the terminal is in a power saving mode (PSM), or the terminal is in a mobile initiated connection only (MICO) mode. However, in a 5th generation (5G) mobile communications system architecture, session management and access and mobility management are separately controlled by different function entities.

In a 5G architecture, an internet of things (IoT) service, for example, may reuse a report mechanism of availability after DDN failure to support high latency communication. A terminal event is subscribed to from a session management function entity that manages a specific service. When receiving a service detection notification from a user plane function entity, the session management function entity notifies an access and mobility management function entity to monitor the terminal event. Therefore, in the 5G architecture, the terminal event may be subscribed to and monitored for the specific service.

In both the 4G and 5G architectures, a problem of subscribing to a terminal event from a network is resolved, but only a solution in a single-system scenario is considered. FIG. 3 is a schematic diagram of a 4G and 5G interworking architecture. In the interworking architecture, a terminal event may be subscribed to from a 4G or 5G network. However, a problem of how to perform terminal event notification when a terminal moves between different systems is not resolved.

SUMMARY

This application provides a communication method and apparatus, to resolve a problem of how to perform terminal event notification when a terminal apparatus accesses different communications systems.

According to a first aspect, a communication method is provided, and the method includes: A first mobility management entity receives first event information from a unified data management function entity, where the first event information is used to indicate a first-type terminal event, the first event information includes an event association identifier, and the event association identifier is used to identify context information of the terminal event, or the event association identifier is used to identify the terminal event report. The first mobility management entity receives a service transmission notification from a session management function entity. When a terminal apparatus is unreachable, the first mobility management entity activates the first-type terminal event based on the first event information, and when the terminal apparatus is reachable, the first mobility management entity sends the terminal event report to an application function entity that subscribes to the first-type terminal event.

In this aspect, the first mobility management function entity may receive event information from the unified data management function entity, where the event information is used to indicate the first-type terminal event. Therefore, when the terminal apparatus is reachable, the first mobility management function entity may send, based on the event information, terminal availability notification information to the application function entity that subscribes to the first-type terminal event, thereby improving pertinence of sending the terminal event report.

In a possible implementation, the first event information further includes indication information, and the indication information is used to indicate the first-type terminal event.

In this implementation, the first event information may include explicit indication information, to indicate the first-type terminal event.

In another possible implementation, the method further includes: After the terminal apparatus is handed over to a communications system, the first mobility management entity receives the first event information from the unified data management function entity.

In this implementation, after the terminal apparatus is handed over to the communications system, a first mobility management entity corresponding to the communications system after the handover does not store the first event information, and may receive the first event information from the unified data management function entity. The unified data management function entity is responsible for providing corresponding event information when the terminal apparatus accesses different communications systems.

In still another possible implementation, the method further includes: After the terminal is handed over to a communications system, the first mobility management entity receives one or more pieces of the second event information from a second mobility management entity, where the second event information does not include the indication information. The first mobility management entity receives the first event information from the unified data management function entity. The first mobility management entity deletes, based on the first event information, second event information corresponding to the first-type terminal event in the one or more pieces of second event information.

In this implementation, after the terminal apparatus is handed over to the communications system, the first mobility management entity may receive the second event information from a second mobility management entity corresponding to a communications system before the handover, but the second event information does not include the indication information. Because the first mobility management entity may perform corresponding activation and event notification on the first-type terminal event, the first mobility management entity further needs to receive the first event information from the unified data management function entity, and the second event information does not indicate different types of terminal events, so that the second event information corresponding to the first-type terminal event in the plurality of pieces of second event information further needs to be deleted, to avoid a conflict when the terminal event is activated based on the first event information and the second event information.

In still another possible implementation, the method further includes: When the terminal is handed over to a communications system, the first mobility management entity obtains second event information based on the first event information, where the second event information does not include the indication information. The first mobility management entity sends the second event information to a second mobility management entity.

In this implementation, after the terminal apparatus is handed over to the communications system, because a second mobility management entity corresponding to the communications system after the handover does not distinguish between types of terminal events, the first mobility management entity may obtain the second event information based on the first event information, that is, map the first event information to the second event information, and does not indicate the type of the terminal event. Then, the first mobility management entity sends the second event information obtained after processing to the second mobility management entity.

In still another possible implementation, the indication information includes a data network name and/or slice information.

In still another possible implementation, the first-type terminal event is an enhanced terminal event, or the first-type terminal event is a non-enhanced terminal event.

In this implementation, the enhanced terminal event may be indicated, or the non-enhanced terminal event may be indicated. When the enhanced terminal event is indicated, it may be known that the type of the terminal event is the enhanced terminal event. The first mobility management entity activates the enhanced terminal event, and when the terminal apparatus is reachable, sends the terminal availability notification message to an application function entity that subscribes to the enhanced terminal event, but does not activate the non-enhanced terminal event and does not send the terminal availability notification. When the non-enhanced terminal event is indicated, it may be known that the type of the terminal event is the non-enhanced terminal event. The first mobility management entity activates the non-enhanced terminal event, and when the terminal apparatus is reachable, sends the terminal availability notification message to an application function entity that subscribes to the non-enhanced terminal event, but does not activate the enhanced terminal event and does not send the terminal availability notification.

According to a second aspect, a communication method is provided, and the method includes: A unified data management function entity receives third event information from a control function entity, where the third event information includes an event association identifier, and the event association identifier is used to identify context information of the terminal event, or the event association identifier is used to identify the terminal event report. When the terminal event is a first-type terminal event, the third event information further includes service description information. The unified data management function entity obtains first event information based on the third event information, where the first event information is used to indicate the first-type terminal event or a non-first-type terminal event, and the first event information includes the event association identifier. When a terminal apparatus accesses a first communications system, the unified data management function entity sends the first event information to a first mobility management function entity, where the first event information is used by the first mobility management function entity to activate the first-type terminal event.

In this aspect, the first mobility management function entity may receive event information from the unified data management function entity, where the event information is used to indicate a type of the terminal event. Therefore, when the terminal apparatus is reachable, the first mobility management function entity may send, based on the type of the terminal event, terminal availability notification information to an application function entity that subscribes to the terminal event of the type, thereby improving pertinence of the terminal availability notification.

In a possible implementation, the first event information further includes indication information, and the indication information is used to indicate the first-type terminal event.

In another possible implementation, the method further includes: When the terminal apparatus is handed over to a second communications system, the unified data management function entity sends second event information to a second mobility management function entity, where the second event information does not include the indication information, and the second event information is used to activate all terminal events.

In this implementation, the second mobility management function entity cannot distinguish between types of subscribed terminal events, and cannot send the terminal availability notification information accordingly.

In still another possible implementation, the method further includes: After the terminal is handed over from the second communications system to the first communications system, the unified data management function entity sends the first event information to the first mobility management function entity.

In still another possible implementation, the method further includes: After the terminal is handed over from the first communications system to the second communications system, the unified data management function entity sends the second event information to the second mobility management function entity.

According to a third aspect, a communications apparatus is provided, to implement the communication method according to the first aspect. For example, the communications apparatus may be a chip or a device. The foregoing method may be implemented by using software, hardware, or hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (instructions) and/or data that is (are)/is necessary for the apparatus. Optionally, the communications apparatus may further include a communications interface, configured to support communication between the apparatus and another network element.

In another possible implementation, the communications apparatus may include a unit module that performs a corresponding action in the foregoing method.

The apparatus includes:
- a transceiver unit, configured to receive first event information from a unified data management function entity, where the first event information is used to indicate a first-type terminal event, the first event information includes an event association identifier, and the event association identifier is used to identify context information of the terminal event, or the event association identifier is used to identify the terminal event report, where
- the transceiver unit is further configured to receive a service transmission notification from a session management function entity; and
- a processing unit, configured to: when a terminal apparatus is unreachable, activate the first-type terminal event based on the first event information, where
- the transceiver unit is further configured to: when the terminal apparatus is reachable, send the terminal event report to an application function entity that subscribes to the first-type terminal event.

Optionally, the first event information further includes indication information, and the indication information is used to indicate the first-type terminal event.

Optionally, the transceiver unit is further configured to: after the terminal apparatus is handed over to a communications system, receive the first event information from the unified data management function entity.

Optionally, the transceiver unit is further configured to: after the terminal is handed over to a communications system, receive one or more pieces of the second event information from a second mobility management entity, where the second event information does not include the indication information.

The transceiver unit is further configured to receive the first event information from the unified data management function entity.

The processing unit is further configured to delete, based on the first event information, second event information corresponding to the first-type terminal event in the one or more pieces of second event information.

Optionally, the processing unit is further configured to: when the terminal is handed over to a communications system, obtain second event information based on the first event information, where the second event information does not include the indication information.

The processing unit is further configured to send the second event information to a second mobility management entity.

Optionally, the indication information includes a data network name and/or slice information.

Optionally, the first-type terminal event is an enhanced terminal event, or the first-type terminal event is a non-enhanced terminal event.

In still another possible implementation, a processor and a transceiver apparatus are included. The processor is coupled to the transceiver apparatus. The processor is configured to execute a computer program or instructions, to control the transceiver apparatus to receive and send information. When the processor executes the computer program or the instructions, the processor is further configured to implement the foregoing method. The transceiver apparatus may be a transceiver, a transceiver circuit, or an input/output interface. When the communications apparatus is the chip, the transceiver apparatus is the transceiver circuit or the input/output interface.

The processor is configured to perform the following steps:
- controlling the transceiver apparatus to receive first event information from a unified data management function entity, where the first event information is used to indicate a first-type terminal event, the first event information includes an event association identifier, and the event association identifier is used to identify context information of the terminal event, or the event association identifier is used to identify the terminal event report;
- controlling the transceiver apparatus to receive a service transmission notification from a session management function entity;
- when a terminal apparatus is unreachable, activating the first-type terminal event based on the first event information; and
- when the terminal apparatus is reachable, controlling the transceiver apparatus to send the terminal event report to an application function entity that subscribes to the first-type terminal event.

Optionally, the first event information further includes indication information, and the indication information is used to indicate the first-type terminal event.

Optionally, the processor further performs the following step: after the terminal apparatus is handed over to a communications system, controlling the transceiver apparatus to receive the first event information from the unified data management function entity.

Optionally, the processor further performs the following steps: after the terminal is handed over to a communications system, controlling the transceiver apparatus to receive one or more pieces of the second event information from a second mobility management entity, where the second event information does not include the indication information;
- controlling the transceiver apparatus to receive the first event information from the unified data management function entity; and
- deleting, based on the first event information, second event information corresponding to the first-type terminal event in the one or more pieces of second event information.

Optionally, the processor further performs the following steps: when the terminal is handed over to a communications system, obtaining second event information based on the first event information, where the second event information does not include the indication information; and controlling the transceiver apparatus to send the second event information to a second mobility management entity.

Optionally, the indication information includes a data network name and/or slice information.

Optionally, the first-type terminal event is an enhanced terminal event, or the first-type terminal event is a non-enhanced terminal event.

When the communications apparatus is the chip, a sending unit may be an output unit, for example, an output circuit or a communications interface; and a receiving unit may be an input unit, for example, an input circuit or a communications interface. When the communications apparatus is a network device, a sending unit may be a transmitter or a transmitting machine, and a receiving unit may be a receiver or a receiving machine.

According to a fourth aspect, a communications apparatus is provided, to implement the communication method according to the second aspect. For example, the communications apparatus may be a chip or a device, and the foregoing method may be implemented by using software, hardware, or hardware executing corresponding software.

In a possible implementation, a structure of the communications apparatus includes a processor and a memory. The processor is configured to support the apparatus in performing a corresponding function in the foregoing communication method. The memory is configured to be coupled to the processor, and the memory stores a program (instructions) and data that are necessary for the apparatus. Optionally, the communications apparatus may further include a communications interface, configured to support communication between the apparatus and another network element.

In another possible implementation, the communications apparatus may include a unit module that performs a corresponding action in the foregoing method.

The apparatus includes:
a transceiver unit, configured to receive third event information from a control function entity, where the third event information includes an event association identifier, the event association identifier is used to identify context information of the terminal event, or the event association identifier is used to identify the terminal event report, and when the terminal event is a first-type terminal event, the third event information further includes service description information; and
a processing unit, configured to obtain first event information based on the third event information, where the first event information is used to indicate the first-type terminal event or a non-first-type terminal event, and the first event information includes the event association identifier.

The transceiver unit is further configured to: when a terminal apparatus accesses a first communications system, send the first event information to a first mobility management function entity, where the first event information is used to activate the first-type terminal event.

Optionally, the first event information further includes indication information, and the indication information is used to indicate the first-type terminal event.

Optionally, the transceiver unit is further configured to: when the terminal apparatus is handed over to a second communications system, send second event information to a second mobility management function entity, where the second event information does not include the indication information, and the second event information is used to activate all terminal events.

Optionally, after the terminal is handed over from the second communications system to the first communications system, the transceiver unit is further configured to send the first event information to the first mobility management function entity.

Optionally, after the terminal is handed over from the first communications system to the second communications system, the transceiver unit is further configured to send the second event information to the second mobility management function entity.

In still another possible implementation, a processor and a transceiver apparatus are included. The processor is coupled to the transceiver apparatus. The processor is configured to execute a computer program or instructions, to control the transceiver apparatus to receive and send information. When the processor executes the computer program or the instructions, the processor is further configured to implement the foregoing method. The transceiver apparatus may be a transceiver, a transceiver circuit, or an input/output interface. When the communications apparatus is the chip, the transceiver apparatus is the transceiver circuit or the input/output interface.

The processor is configured to perform the following steps:
controlling the transceiver apparatus to receive third event information from a control function entity, where the third event information includes an event association identifier, the event association identifier is used to identify context information of the terminal event, or the event association identifier is used to identify the terminal event report, and when the terminal event is a first-type terminal event, the third event information further includes service description information;
obtaining first event information based on the third event information, where the first event information is used to indicate the first-type terminal event or a non-first-type terminal event, and the first event information includes the event association identifier; and
when a terminal apparatus accesses a first communications system, controlling the transceiver apparatus to send the first event information to a first mobility management function entity, where the first event information is used to activate the first-type terminal event.

Optionally, the first event information further includes indication information, and the indication information is used to indicate the first-type terminal event.

Optionally, the processor further performs the following step: when the terminal apparatus is handed over to a second communications system, controlling the transceiver apparatus to send second event information to a second mobility management function entity, where the second event information does not include the indication information, and the second event information is used to activate all terminal events.

Optionally, the processor further performs the following step: after the terminal is handed over from the second communications system to the first communications system, controlling the transceiver apparatus to send the first event information to the first mobility management function entity.

Optionally, the processor further performs the following step: after the terminal is handed over from the first communications system to the second communications system, controlling the transceiver apparatus to send the second event information to the second mobility management function entity;

When the communications apparatus is the chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receiving machine); and a sending unit may be a transmitter (which may also be referred to as a transmitting machine).

According to a fifth aspect, a computer-readable storage medium is provided. The computer-readable storage medium stores instructions, and when the instructions are run on a computer, the computer is enabled to perform the methods described in the foregoing aspects.

According to a sixth aspect, a computer program product including instructions is provided, and when the computer program product runs on a computer, the computer is enabled to perform the methods described in the foregoing aspects.

BRIEF DESCRIPTION OF DRAWINGS

FIG. 6A, FIG. 6B, and FIG. 6C are a schematic flowchart of an example of an event information configuration method;

FIG. 7A, FIG. 7B, and FIG. 7C are a schematic diagram of a subsequent event detection, activation, and notification procedure corresponding to FIG. 6A, FIG. 6B, and FIG. 6C;

FIG. 9A and FIG. 9B are a schematic flowchart of an example of obtaining event information during handover from 4G to 5G;

FIG. 10A, FIG. 10B, and FIG. 10C are a schematic flowchart of an example of obtaining event information during handover from 5G to 4G;

DESCRIPTION OF EMBODIMENTS

The following describes embodiments of the present invention with reference to the accompanying drawings in the embodiments of the present invention.

Figure 1:
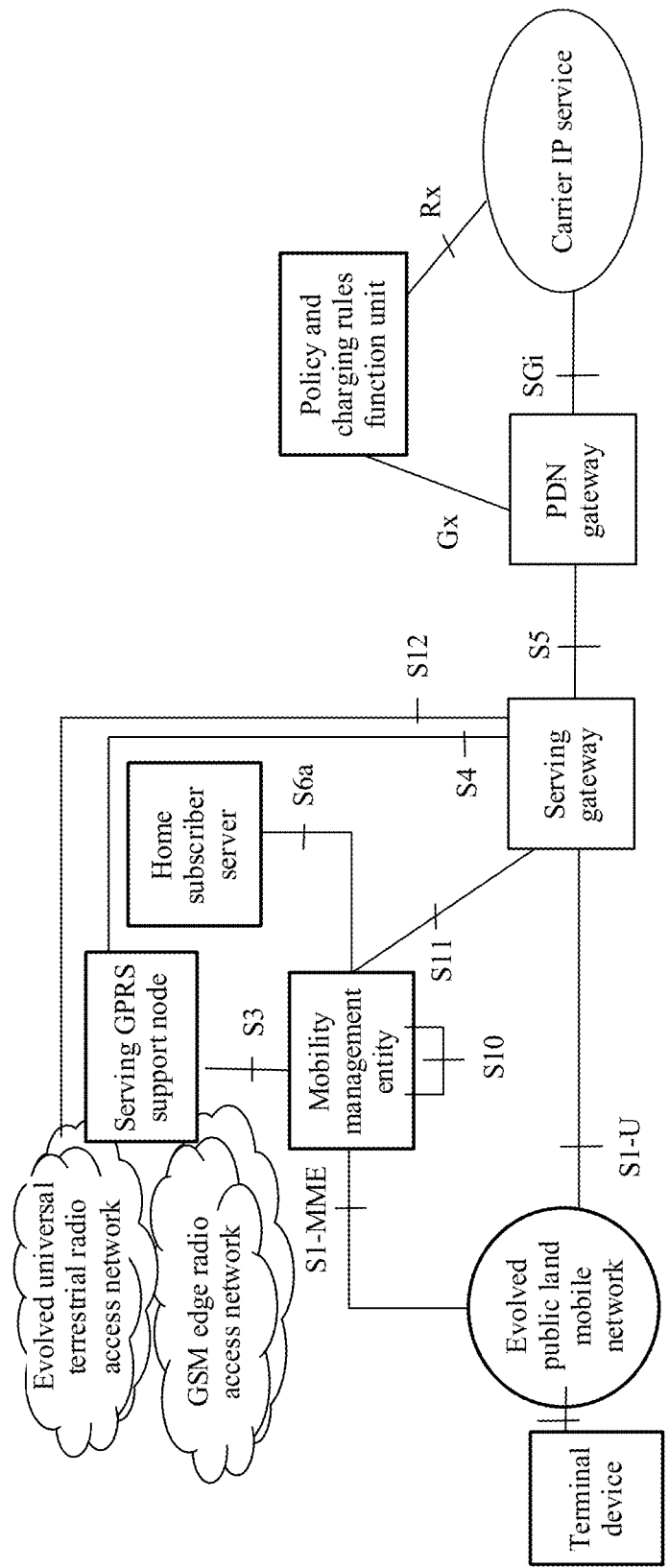
FIG. 1 is a schematic diagram of a non-roaming architecture of an existing EPS network.
Figure 2:
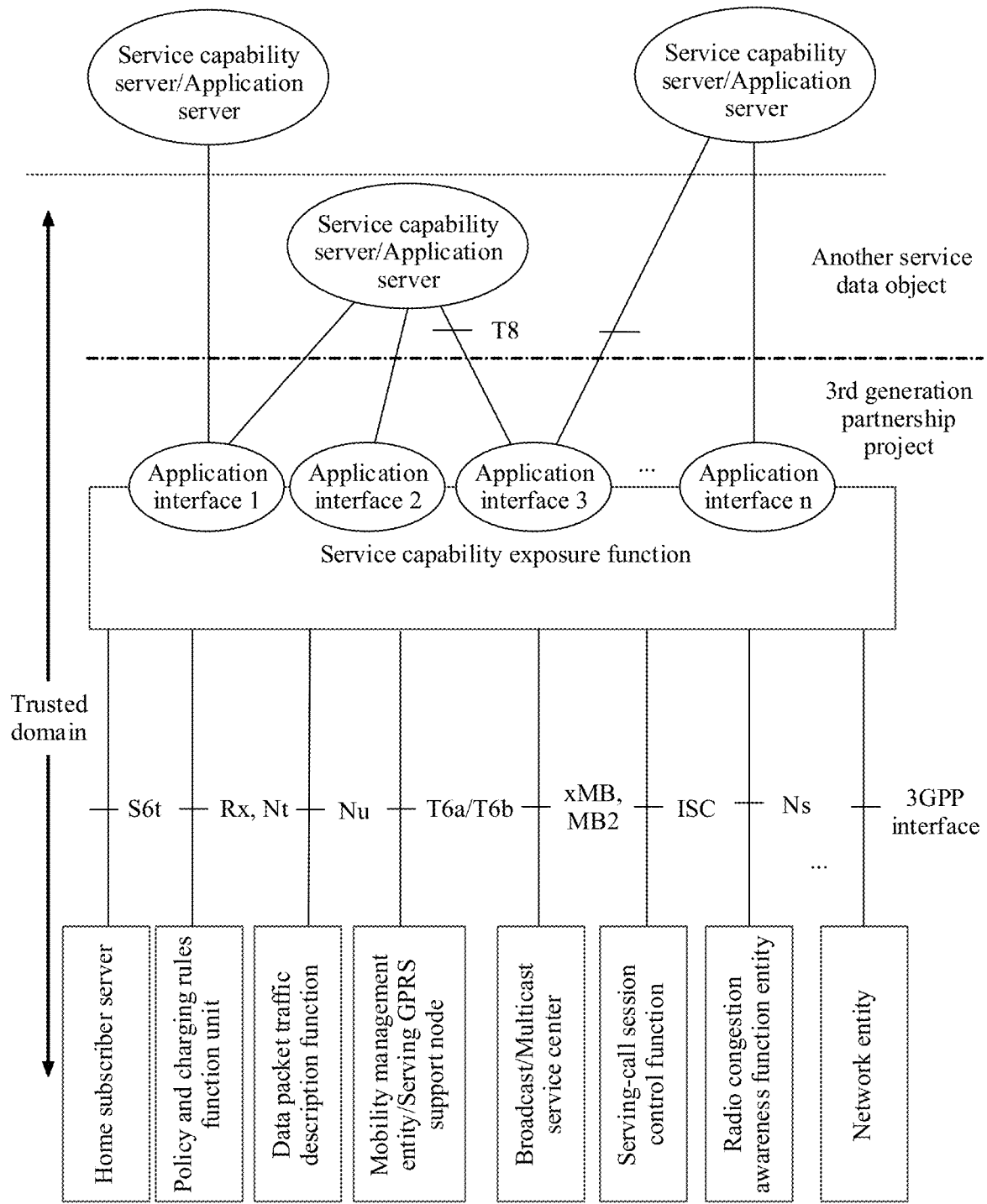
FIG. 2 is a schematic architectural diagram of interfaces in a 3GPP EPS network architecture exposed by an SCEF.
Figure 4A:
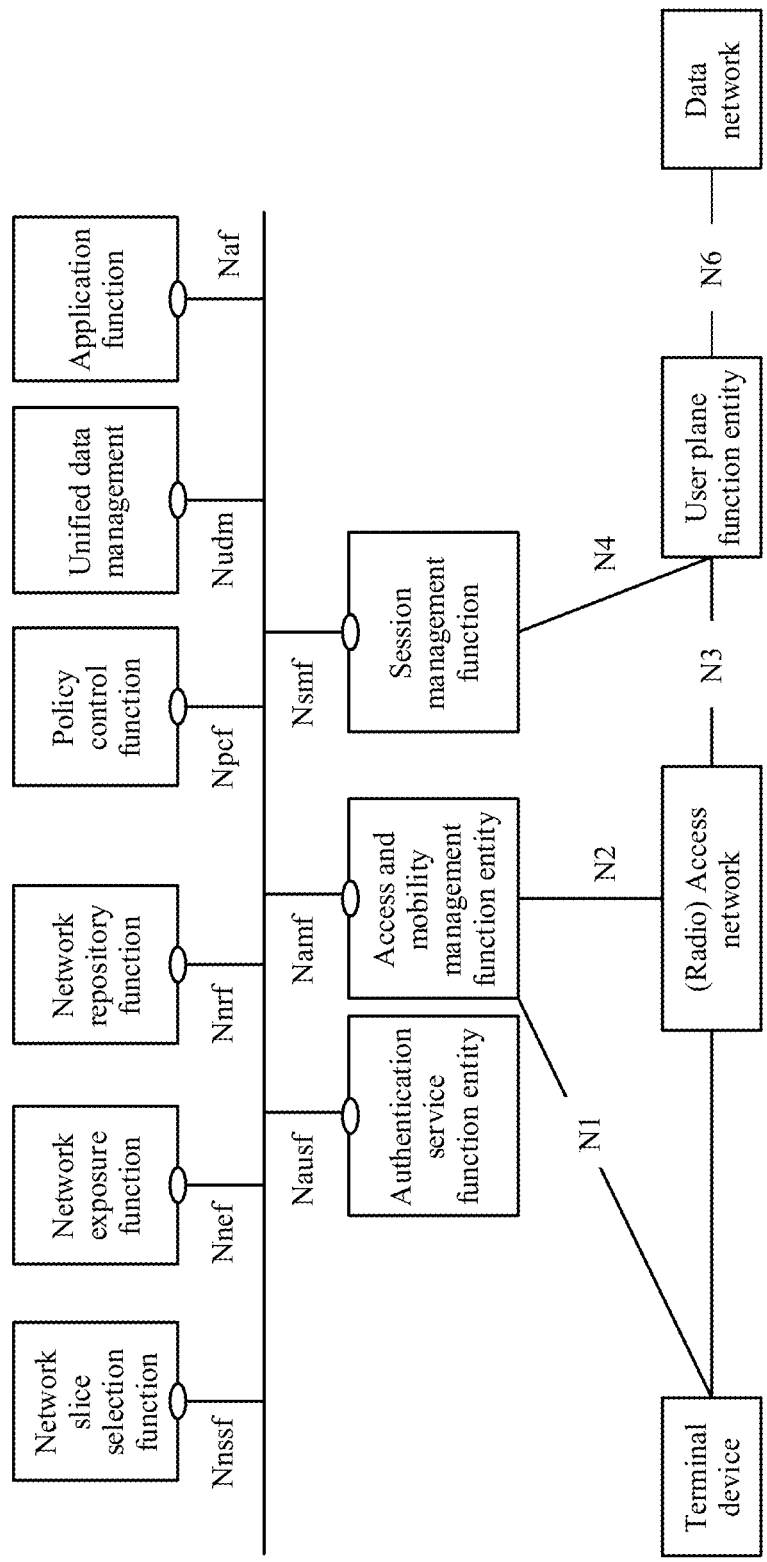
FIG. 4a is a schematic diagram of a 5G non-roaming architecture based on a service-oriented interface.
Figure 4B:
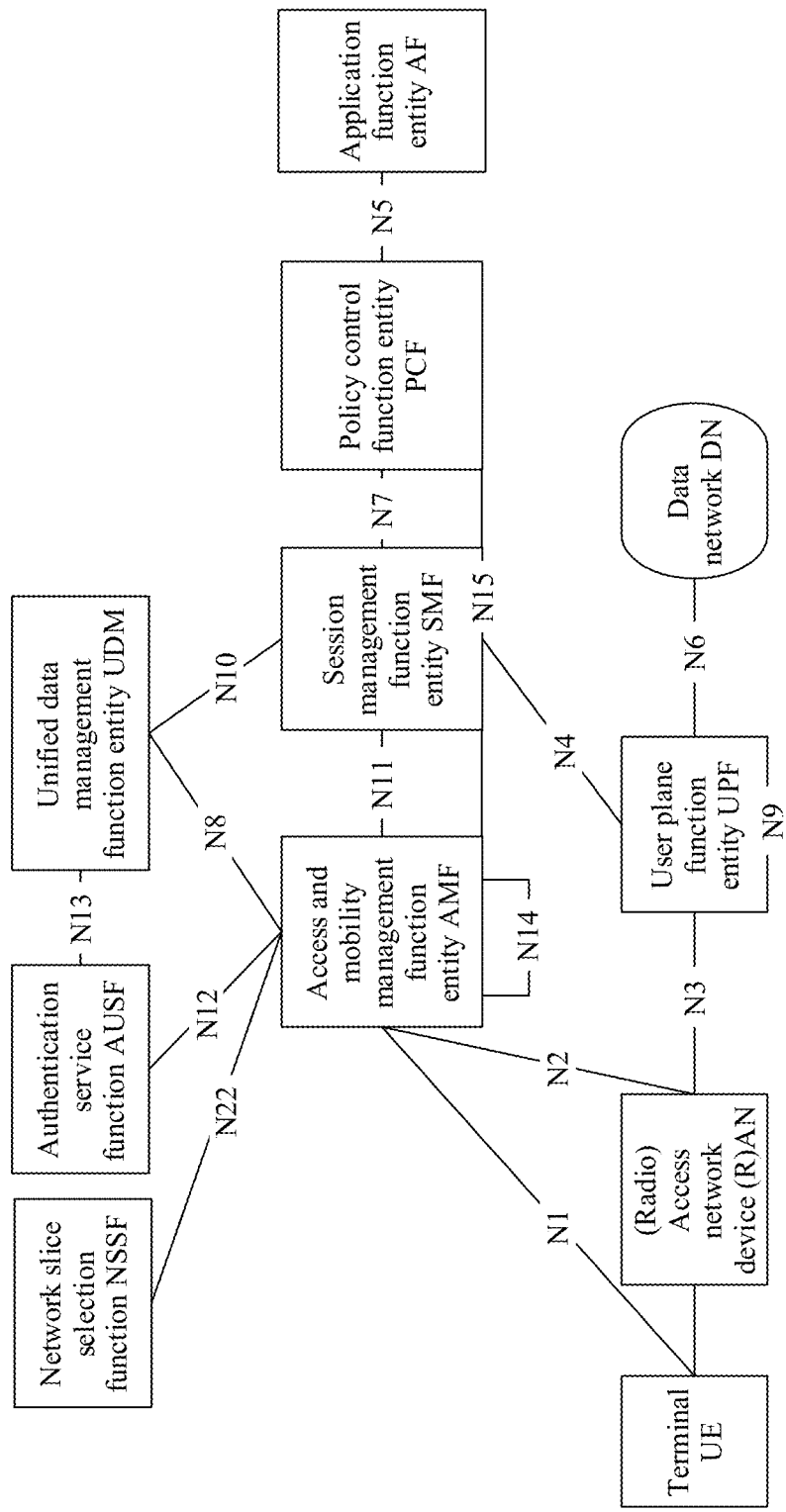
FIG. 4b is a schematic diagram of a 5G non-roaming architecture based on a reference point.

The technical solutions of this application may be applied to a non-roaming architecture of an EPS network shown in FIG. 1, or may be applied to a roaming architecture of an EPS network, or may be applied to a non-roaming architecture and a roaming architecture of a next generation network, for example, a 5G non-roaming architecture based on a service-oriented interface shown in FIG. 4a and a 5G non-roaming architecture based on a reference point shown in FIG. 4b.

5G communications system architectures shown in FIG. 4a and FIG. 4b are used as an example. The communications system mainly includes an access and mobility management function (AMF) entity, a session management function (SMF) entity, a user plane function (UPF) entity, a network exposure function (NEF) entity; and an application function (AF) entity. The communications system may further include a policy control function (PCF) entity, a unified database function (UDR) entity, and a unified data management (UDM) function entity. It should be noted that function entities and functions of the function entities included in FIG. 4a and FIG. 4b may be the same. In FIG. 4a, for the service-oriented interface, a message sent by one function entity to another function entity needs to carry an identifier of the another function entity. However, in FIG. 4b, for the reference point, a message between function entities is an interface-based message, and does not need to carry an identifier of a function entity.

The functions of the function entities in FIG. 4a and FIG. 4b are as follows:

The AMF entity is mainly responsible for signaling processing, such as access control, mobility management, attachment and detachment, gateway selection, and other functions. When the AMF entity provides a service to a session in a terminal, the AMF entity provides a control plane storage resource to the session, to store a session identifier, an SMF entity identifier associated with the session identifier, and the like.

The SMF entity is mainly responsible for session management, and is specifically responsible for user plane function entity selection, user plane function entity redirection, internet protocol (IP) address assignment, bearer establishment, modification, and release, and quality of service (QOS) control.

The UPF entity is responsible for forwarding and receiving user data in the terminal. The UPF entity may receive user data from a data network, and transmit the user data to the terminal through an access network device. Further, the UPF entity may receive user data from the terminal through the access network device, and forward the user data to the data network. A transmission resource and a scheduling function in the UPF entity that provide a service to the terminal are managed and controlled by the SMF entity.

The NEF entity mainly supports secure interaction between a 3GPP network and a third-party application. The NEF can securely expose a network capability and an event to the third-party application, to enhance or improve quality of service of the application. The 3GPP network can also securely obtain related data from the third-party application, to enhance intelligent decision-making of the network. In addition, the function entity supports restoring structured data from the UDR or storing structured data into the UDR.

The AF entity mainly supports interacting with the 3GPP network to provide a service, for example, affecting a data routing decision and a policy control function, or providing some business services (these services may be third-party (3rd party) services or may not be third-party services) to a network side.

The PCF entity mainly supports providing a unified policy framework to control a network behavior, and providing a policy rule to a control layer network function, and is also responsible for obtaining user subscription information related to policy decision-making.

The UDR entity is mainly responsible for storing the structured data, and stored content includes subscription data and policy data, externally exposed structured data, and application-related data.

The UDM entity is mainly configured to manage user subscription information.

It should be noted that each foregoing function entity is only a name, and the name does not constitute a limitation on the entity. For example, the session management function entity may also be replaced with a "session management function" or another name. In addition, the session management function entity may also correspond to an entity that includes another function in addition to the session management function. The user plane function entity may also be replaced with a "user plane function" or another name. In addition, the user plane function entity may also correspond to an entity that includes another function in addition to the user plane function. Uniform descriptions are provided herein, and details are not described below again.

A terminal accesses a network through a radio access network (RAN) device or an access network (AN) device. The RAN device is mainly a wireless network device in the 3GPP network, and the AN may be an access network device defined in non-3GPP.

In this application, the terminal may be user equipment (UE), a handheld terminal, a notebook computer, a subscriber unit, a cellular phone, a smart phone, a wireless data card, a personal digital assistant (PDA) computer, a tablet computer, a wireless modem, a handheld device, a laptop computer, a cordless phone, a wireless local loop (WLL) station, a machine type communication (MTC) terminal, or another device that can access the network.

The terminal and the radio access network (RAN) device may communicate with each other by using an air interface technology. The RAN device is mainly responsible for functions such as radio resource management, QoS management, and data compression and encryption on an air interface side. The access network device may include base stations in various forms, such as a macro base station, a micro base station (which is also referred to as a small cell), a relay station, and an access point. In systems that use different radio access technologies, names of a device that has a base station function may be different. For example, in a 5G system, the device is referred to as a gNB, in a long term evaluation (LTE) system, the device is referred to as an evolved NodeB (eNB or eNodeB), and in a 3rd generation (3G) system, the device is referred to as a NodeB.

The AN device allows a non-3GPP technology to be used for interconnection and interworking between the terminal and a 3GPP core network. The non-3GPP technology is, for example, a wireless fidelity (Wi-Fi) network, a worldwide interoperability for microwave access (WiMAX) network, or a code division multiple access (CDMA) network.

In this application, that a terminal is in an unavailable state means that a network initiates paging for the terminal but does not receive a response, or the terminal is in a PSM mode, or the terminal is in a MICO-only mode, or the like. The PSM mode means that the terminal is allowed to reduce an energy loss and cannot be immediately reachable to receive service data sent to the terminal. The MICO mode means that only the terminal is allowed to initiate a connection. When the terminal is in the MICO mode and is in an idle state, the network considers that the terminal is unreachable.

In this application, a DDN failure may be that the network detects that the terminal is in the unavailable state, or a priority of data that triggers a DDN (that is, an allocation and reservation priority (ARP)) is not higher than a priority of data that previously triggered the DDN.

In this application, a terminal event may be an event that various types of statuses or information need to be obtained from the network. For example, the technical solutions of this application may be applied to a high latency communication scenario, and the terminal event may be a terminal event of availability after DDN failure. An application function entity that provides the high latency communication service can support latency-insensitive service communication by subscribing to the terminal event of availability after DDN failure. The terminal event may alternatively be a terminal reachable event or the like. The application function entity is installed with a relevant application to provide a corresponding business or service. Terminal event subscription means subscribing to an event notification or modifying a subscribed event through a service operation.

It should be noted that, the terms "system" and "network" in the embodiments of this application may be used interchangeably. The term "a plurality of" means two or more. In view of this. "a plurality of" may also be understood as "at least two" in the embodiments of this application. The term "and/or" is used to describe an association relationship between associated objects and indicates that three relationships may exist. For example, A and/or B may indicate the following cases: Only A exists, both A and B exist, and only B exists. In addition, unless otherwise specified, the character "/" generally indicates an "or" relationship between the associated objects.

In this application, two types of terminal events are defined: an enhanced terminal event and a non-enhanced terminal event. The enhanced terminal event means that when an application function (AF) entity sends a terminal event subscription request to a network, the request includes service description information. The non-enhanced terminal event means that when an AF sends a terminal event subscription request to a network, the request does not include service description information. Correspondingly, an AF that supports the enhanced terminal event may be referred to as an enhanced AF, and an AF that does not support the enhanced terminal event may be referred to as a non-enhanced AF.

Figure 3:
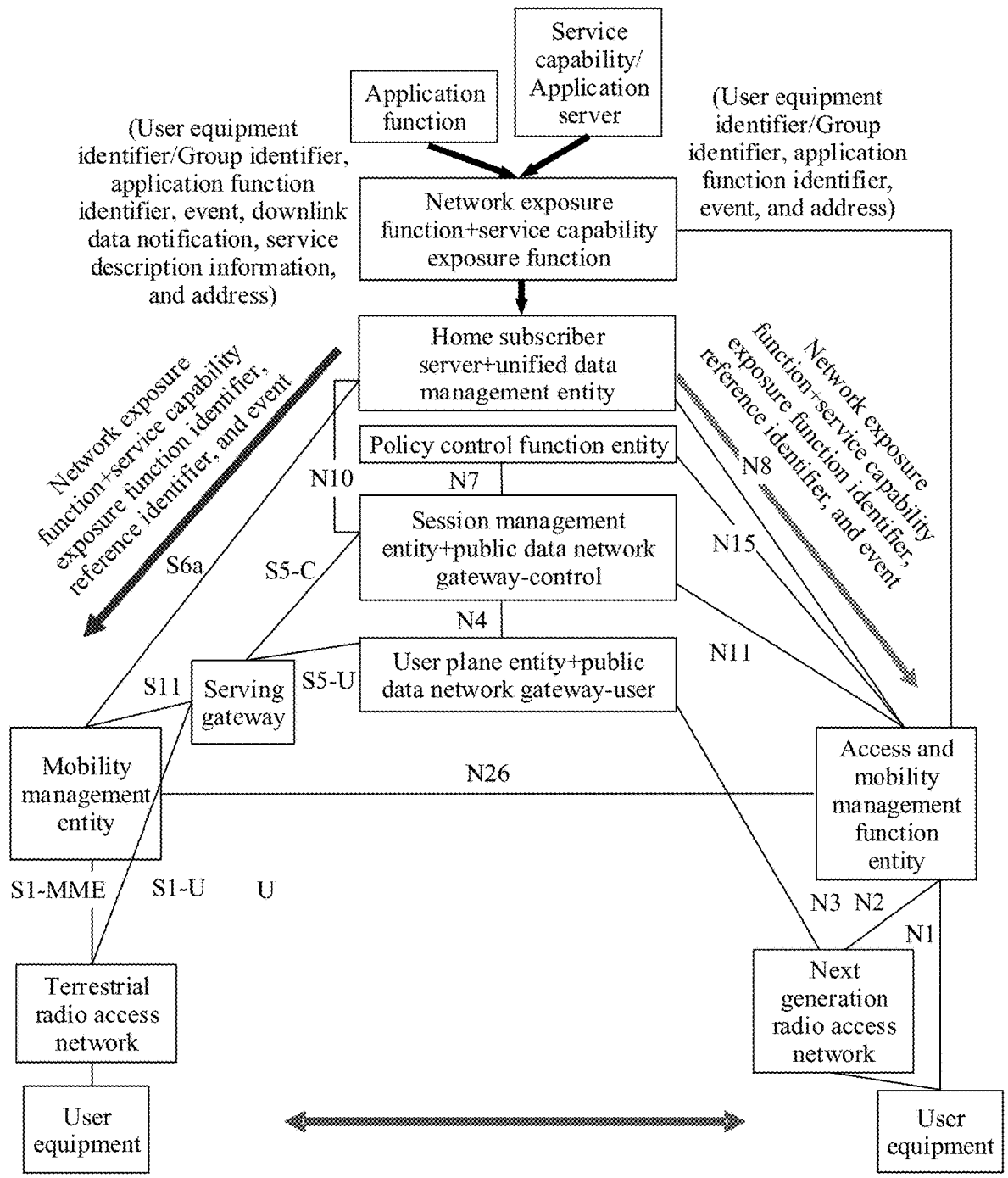
FIG. 3 is a schematic diagram of a 4G and 5G interworking architecture.

In a conventional technology, when the enhanced AF and the non-enhanced AF each subscribe to a terminal event by using an interworking architecture shown in FIG. 3, an existing MME and an existing AMF cannot distinguish whether the terminal event is an enhanced terminal event or a non-enhanced terminal event, and cannot perform a corresponding reporting procedure. When UE moves between different systems, how to process a corresponding event is not defined.

Embodiments of this application provide a communication method and apparatus. A first mobility management function entity may receive event information from a unified data management function entity, where the event information is used to indicate a first-type terminal event. Therefore, when a terminal apparatus is reachable, the first mobility management function entity may send, based on the event information, a terminal event report to an application function entity that subscribes to the first-type terminal event, thereby improving pertinence of sending the terminal event report.

Figure 5:
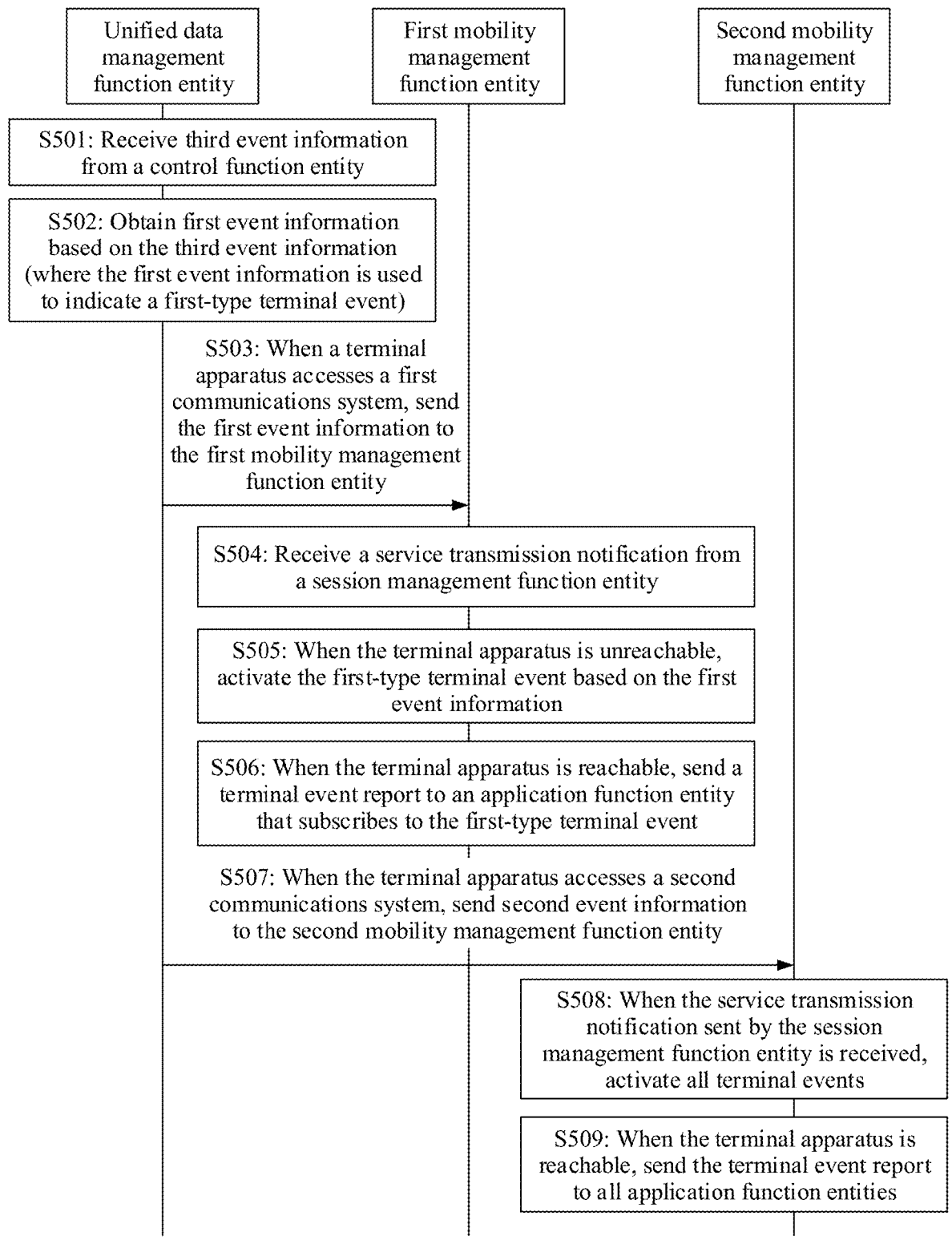
FIG. 5 is a schematic flowchart of a communication method according to an embodiment of this application.

FIG. 5 is a schematic flowchart of a communication method according to an embodiment of this application. The method may include the following steps.

S501: A unified data management function entity receives third event information from a control function entity.

An application function entity subscribes to an event from the control function entity. The control function entity may be, for example, an NEF or an SCEF. An event subscription message includes a GPSI/external group ID, an AF ID, and an event type. The event type is, for example, a terminal event of availability after DDN failure. In this embodiment, when the application function entity is an enhanced application function entity, or when the terminal event is a first-type terminal event, the event subscription message further includes a DNN/NSSAI and service description information (traffic descriptor). When the application function entity is a non-enhanced application function entity or another type of terminal event, the event subscription message does not include the service description information.

The control function entity sends the third event information to the UDM or an HSS. The control function entity (for example, the NEF, the SCEF, or an NEF+SCEF) generates a corresponding event association identifier based on the event subscription message. The event association identifier is used to identify context information of the terminal event, or the event association identifier is used to identify the terminal event report. That is, the control function entity determines an address of a target function entity based on an event association identifier in a received terminal event reporting message. The event association identifier may also be represented as a reference ID. The event association identifier may be used to associate the terminal event with a terminal event context, so that the context information of the terminal event may be determined by using the association identifier. In addition, optionally, the event association identifier may further be used to associate the terminal event with a subscription request of an application function network element and the context information of the terminal event. In another implementation, the event association identifier is used to identify the terminal event report, the association identifier may be included in the terminal event report, and the report may further include a type of the terminal event. By identifying the terminal event report, a terminal event corresponding to the report may be determined, thereby further identifying the context of the terminal event. The event association identifier is used to identify the context information of the terminal event. In a subsequent service transmission process, each function entity may determine, based on the context information of the terminal event, whether to activate the terminal event and report the terminal event report. The event association identifier is used to identify the terminal event report, and a mobility management function entity may determine, based on the event association identifier, whether to report the terminal event report to an application function entity that subscribes to the terminal event.

The third event information includes a UE identifier or a group identifier, the AF ID, and the event type. In this embodiment, when the application function entity is the enhanced application function entity, the event subscription message further includes the DNN/NSSAI and the service description information. Correspondingly, the third event information further includes the DNN/NSSAI and the service description information. When the application function entity is the non-enhanced application function entity, the event subscription message does not include the service description information.

S502: The unified data management function entity obtains first event information based on the third event information.

The UDM may determine, based on the service description information included in the third event information, that the terminal event is the first-type terminal event or a non-first-type terminal event, to obtain the first event information based on the third event information. The first event information is used to indicate the first-type terminal event or the non-first-type terminal event. In other words, that the first event information is obtained based on the third event information means that the first event information is obtained through conversion based on the service description information included in the third event information. Optionally, the first event information may include indication information, and the indication information is used to indicate the first-type terminal event. There is no special definition for the first-type terminal event. A difference between the first-type terminal event and the non-first-type terminal event is that the first-type terminal event may be a terminal event subscribed to by the enhanced AF, and the non-first-type terminal event is a terminal event subscribed to by the non-enhanced AF. Alternatively, the first-type terminal event is a terminal event subscribed to by the non-enhanced AF, and the non-first-type terminal event is a terminal event subscribed to by the enhanced AF. In other words, the type of the terminal event can be used to distinguish whether the terminal event is subscribed to by the enhanced AF or the non-enhanced AF. In this embodiment, an example in which the first event information is used to indicate the first-type terminal event is used for description.

The first event information includes the event association identifier, and may further include an event type and an NEF+SCEF ID. Because the event association identifier is used to identify the context information of the terminal event, a network may learn, based on the event association identifier, that the terminal event is the first-type terminal event or the non-first-type terminal event.

S503: When a terminal apparatus accesses a first communications system, the unified data management function entity sends the first event information to a first mobility management function entity.

The first communications system may be, for example, a 5G system.

The first event information is used to activate the first-type terminal event.

Correspondingly, the first mobility management entity receives the first event information from the unified data management function entity, where the first event information is used to indicate the first-type terminal event, the first event information includes the event association identifier, and the event association identifier is used to identify the context information of the terminal event, or the event association identifier is used to identify the terminal event report.

S504: The first mobility management entity receives a service transmission notification from a session management function entity.

The service transmission notification is used to notify the first mobility management entity that a downlink data notification is received from an application function entity that subscribes to the first-type terminal event.

S505: When the terminal apparatus is unreachable, the first mobility management function entity activates the first-type terminal event based on the first event information.

After receiving the service transmission notification, the first mobility management function entity detects whether the terminal apparatus is reachable. When the terminal apparatus is unreachable, the first mobility management function entity actives the first-type terminal event based on the first event information.

S506: When the terminal apparatus is reachable, the first mobility management function entity sends the terminal event report to the application function entity that subscribes to the first-type terminal event.

When detecting that the terminal apparatus is reachable, the first mobility management function entity sends the terminal event report to the application function entity that subscribes to the first-type terminal event, instead of sending the terminal event report to all application function entities that send a subscription message.

S507: When the terminal apparatus is handed over to a second communications system, the unified data management function entity sends second event information to a second mobility management function entity, where the second event information does not include the indication information.

The second communications system is, for example, a 4G communications system or any generation communications system below 5G. The UDM sends the second event information to the second mobility management function entity. The second event information does not indicate that the terminal event is the first-type terminal event, or does not include the indication information.

S508: When the terminal apparatus is unreachable, the second mobility management function entity activates all terminal events when receiving the service transmission notification sent by the session management function entity.

Because the second event information does not indicate whether the terminal event is the first-type terminal event, when receiving a transmission notification of a service of one or more application function entities and detecting that the terminal apparatus is unreachable, the second mobility management function entity activates all subscribed terminal events.

S509: When the terminal apparatus is reachable, the second mobility management function entity sends the terminal event report information to all application function entities that subscribe to the terminal event.

Because the second event information does not indicate whether the terminal event is the first-type terminal event, when detecting that the terminal apparatus is reachable, the second mobility management function entity sends the terminal event report information to all the application function entities that subscribe to the terminal event.

According to the communication method provided in this embodiment of this application, the first mobility management function entity may receive the event information from the unified data management function entity, where the event information is used to indicate the first-type terminal event. Therefore, when the terminal apparatus is reachable, the first mobility management function entity may send, based on the event information, the terminal event report to the application function entity that subscribes to the first-type terminal event, thereby improving pertinence of sending the terminal event report.

The following separately describes in detail the embodiment shown in FIG. 5 by using examples of an event information configuration procedure and an event detection procedure.

FIG. 6A. FIG. 6B, and FIG. 6C are a schematic flowchart of an example of an event information configuration method. The method includes the following steps:

S601a to S601c: Different AFs (an AF 1, an AF 2, and an AF 3) initiate event subscription to a UDM+HSS/UDM through an NEF+SCEF/NEF. The AF 1 is an enhanced AF, and the AF 2 and the AF 3 are non-enhanced AFs. When the AF 1 sends, to the NEF+SCEF/NEF, an event subscription including {DNN/NSSAI, service description information (traffic descriptor), event type (for example, a terminal event of availability after DDN failure), UE identifier or group identifier (GPSI/external group ID), and application identifier (AF ID)}. When the AF 2 and the AF 3 send, to the NEF+SCEF/NEF, an event subscription including {event type. UE identifier or group identifier, and application identifier}. Herein, the NEF+SCEF means that an NEF and an SCEF are together responsible for the event subscription. The UDM+HSS means that a UDM and an HSS are together responsible for receiving the event subscription.

S602a to S602c: The NEF+SCEF/NEF sends third event information to the UDM+HSS/UDM based on a received event. Specifically, for the AF 1, the NEF+SCEF/NEF sends {DNN/NSSAI, service description information, event type. UE identifier or group identifier. NEF+SCEF/NEF ID, and reference ID 1}. For the AF 2, the NEF+SCEF/NEF sends {UE identifier or group identifier, event type. NEF+SCEF/NEF ID, and reference ID 2}. For AF 3, the NEF+SCEF/NEF sends {UE identifier or group identifier, event type. NEF+SCEF/NEF ID, and reference ID 2}. A reference ID is an event association identifier. The reference ID 1 is used to be associated with a terminal event subscribed to by the AF 1, for example, a first-type terminal event. The reference ID 2 is used to be associated with terminal events subscribed to by the AF 2 and the AF 3, for example, other types of terminal events.

S603: The UDM+HSS/UDM provides event information to an MME or an AMF based on the received third event information and a type of a network accessed by UE.

A specific providing occasion includes: (1) providing the event information to the AMF or the MME in a process of performing a registration procedure or an attach procedure by UE; and (2) after the UE has registered with the network, the UDM+HSS/UDM receives a subscription event and provides the event information to the AMF or the MME at any time.

Specifically, providing information means that for an enhanced event, when the UE performs access through the AMF, the UDM+HSS/UDM provides event information including indication information. Alternatively, optionally, for a non-enhanced event, when the UE performs access through the AMF, the UDM+HSS/UDM provides event information including indication information. When the UE performs access through the MME, the UDM+HSS/UDM always provides existing event information. Alternatively, optionally, for the enhanced event, when the UE performs access through the AMF, the UDM+HSS/UDM provides event information including indication information 1. For the non-enhanced event, when the UE performs access through the AMF, the UDM+HSS/UDM provides event information including indication information 2.

S604a: In the process of performing the attach procedure by the UE, the MME is not modified, and the UDM+HSS/UDM provides second event information to the MME.

Specifically, the event information provided by the UDM+HSS/UDM to the MME is: {Event type. Reference ID 1, NEF+SCEF ID}, {Event type, Reference ID 2, NEF+SCEF ID}, and {Event type, Reference ID 2, NEF+SCEF ID}.

S604b: In the process of performing the registration procedure by the UE, the UDM+HSS/UDM provides first event information to the AMF. Specifically, the event information provided to the AMF is: {Event type. Reference ID 1, NEF+SCEF ID, Indication}, {Event type, Reference ID 2, NEF+SCEF ID}, {Event type, Reference ID 3, NEF+SCEF ID}, or {Event type, Reference ID 1, NEF+SCEF ID}, {Event type, Reference ID 2, NEF+SCEF ID, Indication}, and {Event type, Reference ID 3, NEF+SCEF ID, Indication}.

In this embodiment, based on different AFs that initiate the subscription and different communications systems accessed by the UE, for example, when the UE accesses a 5G communications system, the UDM+HSS/UDM provides the first event information to the AMF, where the first event information is used to indicate the first-type terminal event; and for example, when the UE accesses a 4G communications system, the UDM+HSS/UDM provides the second event information to the MME, where the second event information is not used to indicate the first-type terminal event.

Figure 7B:
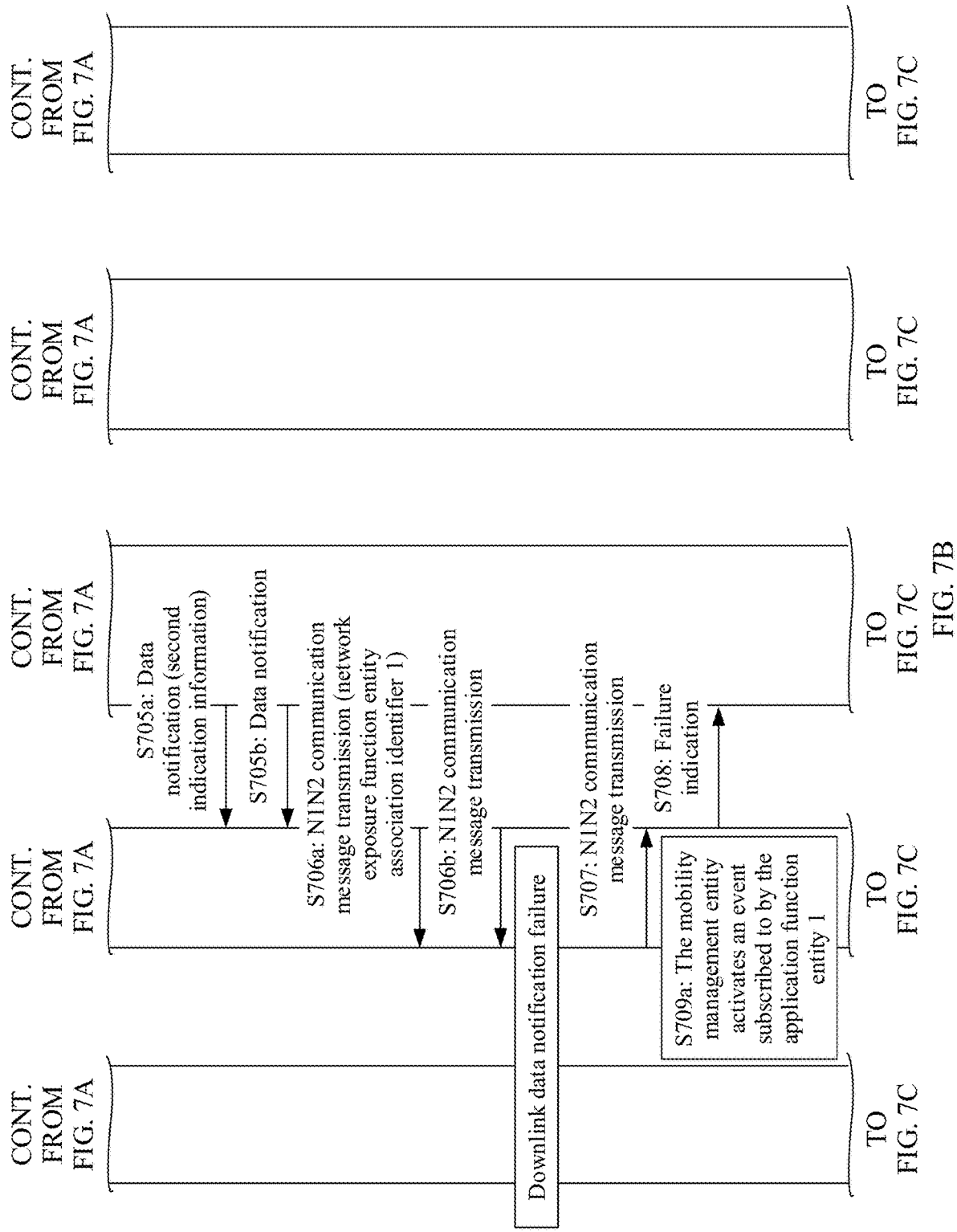
Figure 7C:
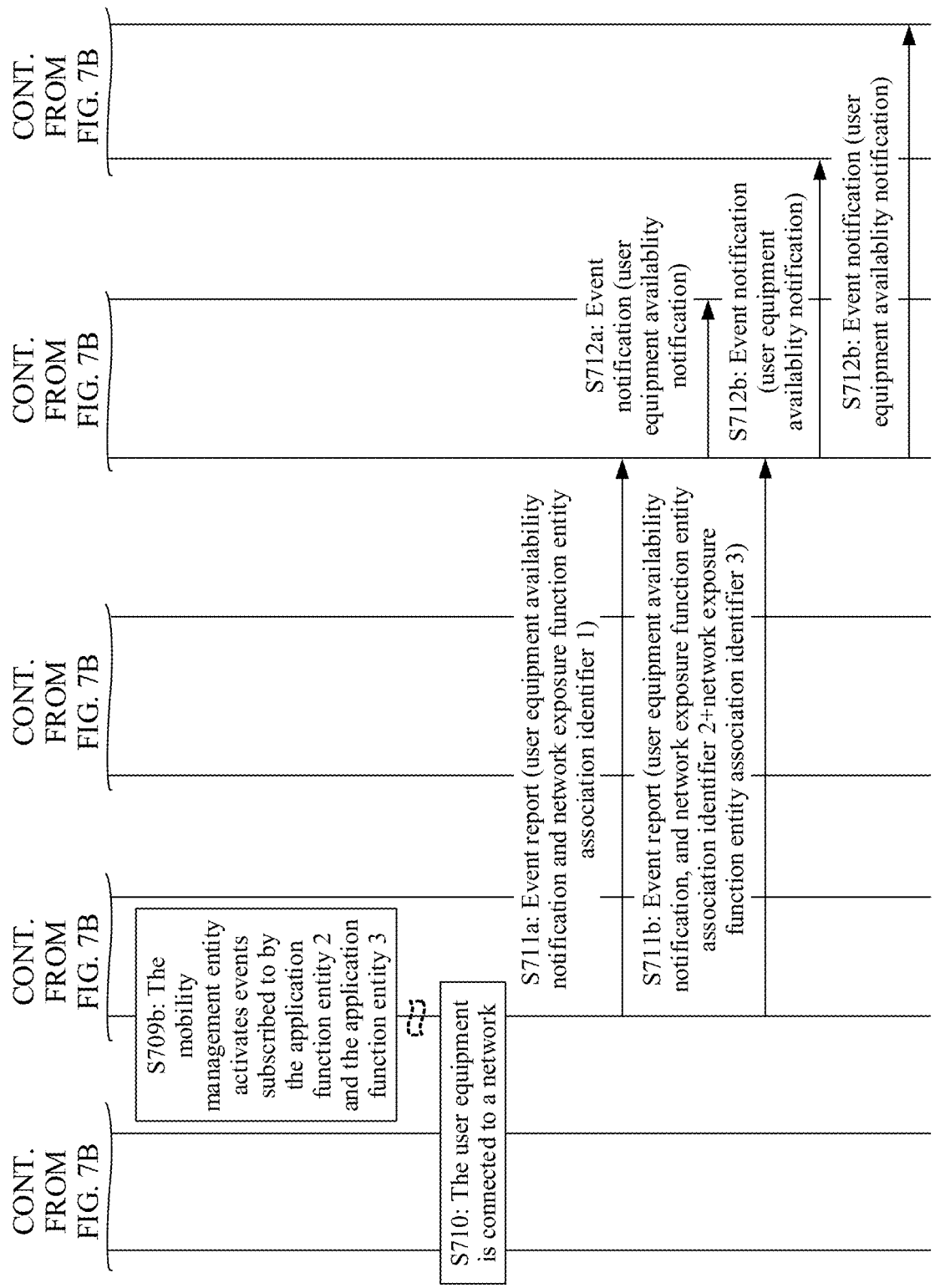

Further, the UDM+HSS/UDM provides event detection information to an SMF, so that the SMF notifies a UPF to detect service information, to determine that a specific service occurs when the UE is unreachable. Corresponding to FIG. 6A, FIG. 6B, and FIG. 6C, a subsequent event detection, activation, and notification procedure is shown in FIG. 7A, FIG. 7B, and FIG. 7C. The method includes the following steps:

S701: A UDM+HSS determines to transmit event information to an SMF.

S702: The UDM+HSS sends event subscription information to the SMF.

The event subscription information includes: an event type, service description information, an NEF+SCEF identifier (NEF+SCEF ID), and an event association identifier (NEF reference ID).

S703: The SMF establishes/modifies an N4 session to a UPF.

During or after session establishment, the UDM+HSS/a UDM provides event service information to the SMF, so that the SMF sends the service information to the UPF. The service information includes a packet filter (PDR) or first indication information. The first indication information is used to indicate to notify the SMF when service data corresponding to the terminal event is detected.

S704a: An AF 1 sends a downlink data packet to UE, and the UPF receives the downlink data packet sent by the AF 1.

S704b: An AF 2 sends a downlink data packet to the UE, and the UPF receives the downlink data packet sent by the AF 2.

S705a: When the UPF receives the downlink data packet sent by the AF 1 and determines that a downlink tunnel is unavailable, the UPF sends a data notification (DN) to the SMF, where the data notification includes second indication information. The second indication information is used to indicate that the downlink data packet sent by the AF 1 is detected.

The SMF may determine, based on the second indication information, that the downlink data packet is sent by the AF 1. The second indication information includes a data network name or slice information.

S705b: When the UPF receives the downlink data packet sent by the AF 2 and determines that a downlink tunnel is unavailable, the UPF sends a data notification to the SMF, where the data notification does not include the second indication information.

Because the data notification does not include the second indication information, the SMF cannot determine whether the downlink data packet is sent by the AF 2 or an AF 3.

S706a: The SMF sends an Namf_communication_N1N2MessageTransfer message to an AMF, where the message includes an NEF reference ID 1.

Because the SMF determines that the downlink data packet is sent by the AF 1, the message includes the NEF reference ID 1 corresponding to the terminal event. An NEF reference ID is used to uniquely identify a subscribed terminal event.

S706b: The SMF sends an Namf_communication_N1N2MessageTransfer message to the AMF, where the message does not include the NEF reference ID.

Because the SMF cannot determine whether the downlink data packet is sent by the AF 2 or the AF 3, the message does not include the NEF reference ID corresponding to the terminal event.

S707: The AMF sends an Nsmf_communication_N1N2MessageTransfer message to the SMF.

S708: The SMF sends a failure indication to the UPF.

S709a: When determining that the UE is unreachable, the AMF activates a UE event, of availability after DDN failure, subscribed to by the AF 1.

After the AMF receives the Namf_communication_N1N2MessageTransfer message sent by the SMF, because the message includes the NEF reference ID 1, the AMF activates a terminal event associated with the NEF reference ID 1.

S709b: When determining that the UE is unreachable, the AMF activates UE events, of availability after DDN failure, subscribed to by the AF 2 and the AF 3.

After the AMF receives the Namf_communication_N1N2MessageTransfer message sent by the SMF, because the message does not include the NEF reference ID, the AMF cannot distinguish whether the downlink data packet is sent by the AF2 or the AF3, the terminal events subscribed to by the AF2 and the AF3 are activated.

S710: The UE is connected to a network.

S711a: The AMF sends an event report to an NEF+SCEF/NEF based on the activated event, where the event report includes a UE availability notification and the NEF reference ID 1.

After detecting that the UE is connected to the network and the terminal event subscribed to by the AF 1 is activated, the AMF sends the event report to the NEF+SCEF/NEF, and the event report includes the NEF reference ID 1.

S711b: The AMF sends an event report to the NEF+SCEF/NEF based on the activated event, where the event report includes the UE availability notification, an NEF reference ID 2, and an NEF reference ID 3.

After detecting that the UE is connected to the network and the terminal events subscribed to by the AF 2 and the AF 3 are activated, the AMF sends the event report to the NEF+SCEF/NEF, and the event report includes the NEF reference ID 2 and the NEF reference ID 3.

S712a: The NEF+SCEF/NEF sends a subscription event notification to the AF 1, where the subscription event notification is used to notify that the UE is available.

After receiving the event report, the NEF+SCEF/NEF sends the subscription event notification to the AF 1 based on the NEF reference ID 1 included in the event report.

S712b: The NEF+SCEF/NEF sends a subscription event notification to each of the AF 2 and the AF 3, where the subscription event notification is used to notify that the UE is available.

After receiving the event report, the NEF+SCEF/NEF sends the subscription event notification to each of the AF 2 and the AF 3 based on the NEF reference ID 2 and the NEF reference ID 3 that are included in the event report.

It can be seen that, because the AF 2 and the AF 3 are not enhanced AFs, when the network performs subscription event activation and notification, the network cannot distinguish whether downlink data is sent by the AF 2 or the AF 3. Therefore, when the UE is available, the network sends an event notification to each of the AF 2 and the AF 3.

In this embodiment, when receiving downlink data sent by an AF that subscribes to a first-type terminal event, and when the UE is unavailable, the AMF may activate the terminal event based on first event information, and send a terminal event report to only the AF when the UE is available. When downlink data is sent by other AFs, the AMF cannot determine a specific AF that sends the downlink data, and therefore sends the terminal event report to all AFs when the UE is available.

The UE may be handed over between communications systems with different standards, for example, handed over from a 5G communications system to a 4G communications system, or handed over from a 4G communications system to a 5G communications system. A mobility management function entity in a communications system after the handover may not store the foregoing event information. For how the mobility management function entity obtains corresponding event information in a handover process of the UE, the following embodiment provides a corresponding solution.

Figure 8:
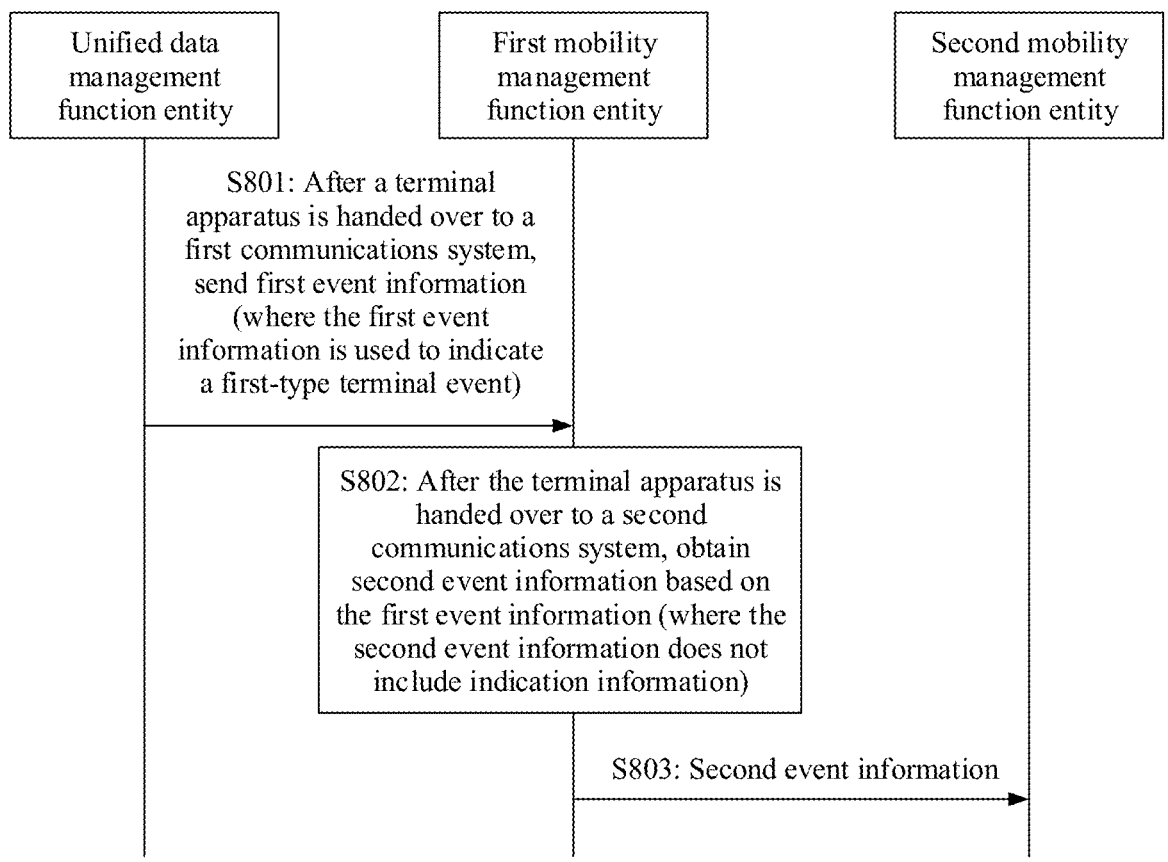
FIG. 8 is a schematic flowchart of another communication method according to an embodiment of this application.

FIG. 8 is a schematic flowchart of another communication method according to an embodiment of this application. The method may include the following steps:

S801: After a terminal apparatus is handed over to a first communications system, a unified data management function entity sends first event information to a first mobility management function entity.

Before the handover, the terminal apparatus is in a second communications system, for example, may be a 4G system. The terminal apparatus is handed over from the second communications system to the first communications system. The first communications system may be, for example, a 5G system. The UDM sends the first event information to the first mobility management function entity based on that an accessed network is the first communications system. The first mobility management function entity always uses the first event information provided by the UDM. Optionally, the first event information is used to indicate a first-type terminal event, that is, it may be determined, based on content included in the first event information, that the first event information corresponds to the first-type terminal event. Optionally, the first event information also includes indication information. The indication information is used to indicate the first-type terminal event. Explicit indication information is used to indicate that the first event information corresponds to the first-type terminal event. In other words, the first event information describes information about the first-type terminal event.

Optionally, in a handover process, a second mobility management function entity in the second communications system may also provide second event information to the first mobility management function entity. The second event information does not include the indication information, that is, cannot indicate a specific type of terminal event corresponding to the second event information. After receiving the first event information sent by the UDM, the first mobility management function entity updates local event information based on the information provided by the UDM, and deletes second event information corresponding to the first-type terminal event in the second event information received from the second mobility management function entity. The second event information provided by the second mobility management function entity includes event information corresponding to the first-type terminal event, and also includes event information corresponding to another type of terminal event, and the event information corresponding to the another type of terminal event does not need to be indicated. Therefore, the local event information may be updated based on the information provided by the UDM, and the second event information corresponding to the first-type terminal event in the second event information received from the second mobility management function entity is deleted.

S802: After the terminal apparatus is handed over to the second communications system, the first mobility management function entity obtains the second event information based on the first event information.

After the terminal apparatus is handed over from the first communications system to the second communications system, the second event information provided by the first mobility management function entity to the second mobility management function entity does not include the indication information. Therefore, the first mobility management entity first obtains the second event information based on the first event information. In other words, the first event information is mapped to the second event information, that is, mapped to event information that does not include the indication information.

The foregoing example is still used. For example, the event information {Event type, Reference ID 1, NEF+SCEF ID, Indication}, {Event type, Reference ID 2, NEF+SCEF ID}, {Event type, Reference ID 3, NEF+SCEF ID}, or {Event type, Reference ID 1, NEF+SCEF ID}, {Event type, Reference ID 2, NEF+SCEF ID, Indication}, and {Event type, Reference ID 3, NEF+SCEF ID, Indication} is mapped to: {Event type, Reference ID 1, NEF+SCEF ID}, {Event type, Reference ID 2, NEF+SCEF ID}, and {Event type, Reference ID 2, NEF+SCEF ID}.

S803: The first mobility management function entity sends the second event information to the second mobility management function entity.

According to the communication method provided in this embodiment of this application, when handover is performed between different communications systems, for example, when handover is performed from the 4G system to the 5G system, the mobility management function entity may obtain the first event information from the unified data management function entity, or the mobility management function entity obtains one or more pieces of second event information from a mobility management function entity in a communications system before the handover, receives the first event information from the same data management function entity, and deletes the second event information corresponding to the first-type terminal event in the one or more pieces of second event information. Therefore, the mobility management function entity may obtain the event information in a timely manner, activate the terminal event based on the event information, and when the terminal apparatus is reachable, send, in a timely manner, a terminal event report to an application function entity that subscribes to the terminal event. For example, when handover is performed from the 5G system to the 4G system, a mobility management function entity in a communications system before the handover may obtain the second event information based on the first event information, and send the second event information to a mobility management function entity in a communications system after the handover, to adapt to a mobility management function entity that does not change.

After the handover of the communications system shown in FIG. 8, the following separately describes, by using FIG. 9A and FIG. 9B and FIG. 10A, FIG. 10B, and FIG. 10C, a method in which the mobility management entity in the communications system after the handover obtains the event information when handover is performed from 4G to 5G or from 5G to 4G.

Figure 9B:
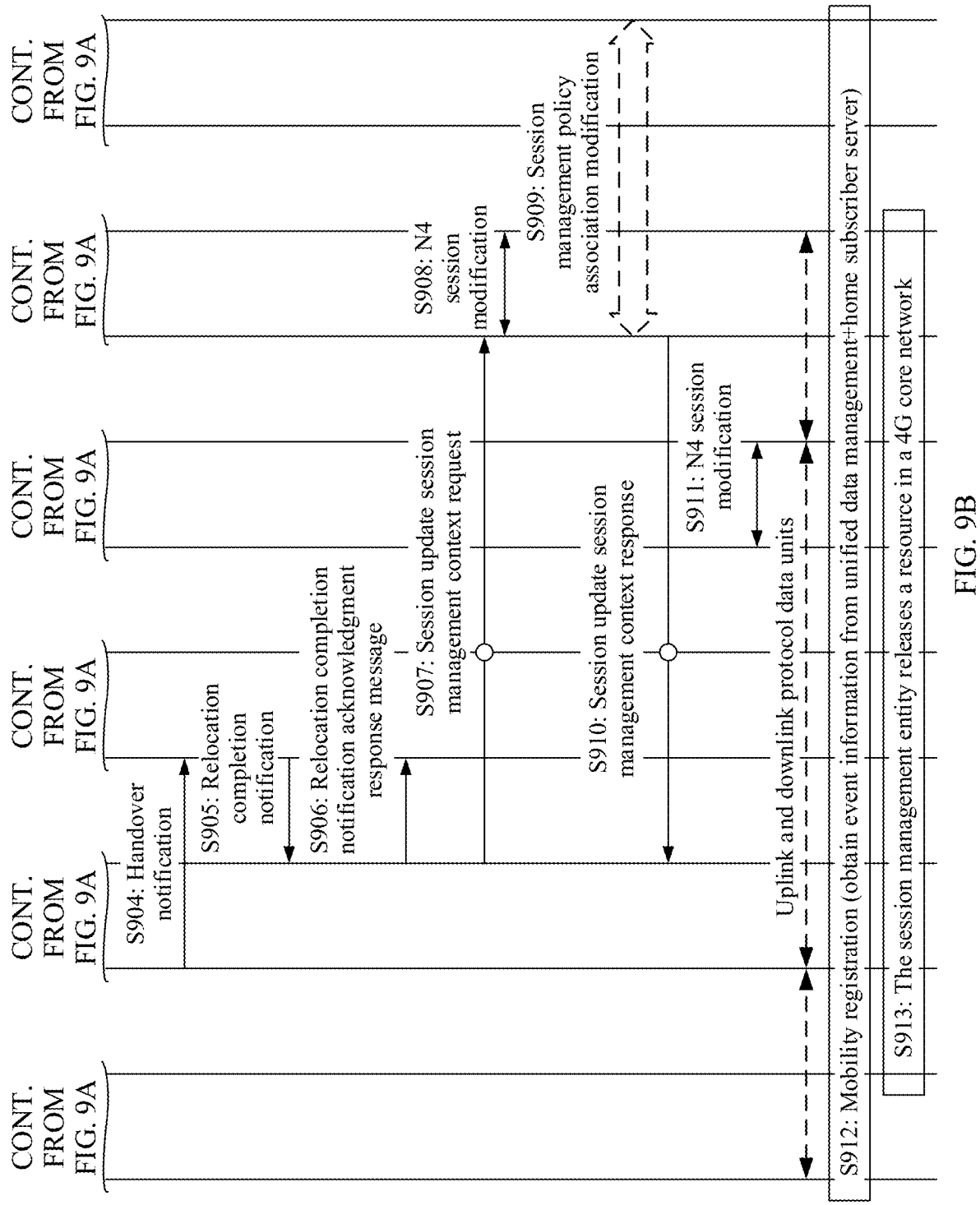

FIG. 9A and FIG. 9B are a schematic flowchart of an example of obtaining event information during handover from 4G to 5G. In a 4G system, a mobility management function entity may be an MME. In a 5G system, a mobility management function entity may be an AMF. When UE is handed over from 4G to 5G, the MME sends obtained event information to the AMF. The MME does not need to be enhanced.

A specific handover procedure is as follows:

S901: The MME sends a handover command to an E-UTRAN.

The E-UTRAN is an access network device in the 4G system. The handover command is used to indicate to hand over to the 5G system.

S902: The E-UTRAN sends a handover command (handover from E-UTRAN command) to the UE.

S903: The UE sends a handover confirmation response message (handover to 5G-RAN confirm) to a 5G NG-RAN.

The 5G NG-RAN is an access network device in the 5G system.

S904: The NG-RAN sends a handover notification (handover notify) to the AMF.

S905: The AMF sends a relocation completion notification (forward relocation complete notification) to the MME.

S906: The MME sends a relocation completion notification acknowledgment response message (forward relocation complete notification ack) to the AMF.

In a handover preparation phase, the MME sends stored event information to the AMF. The MME does not need to be enhanced.

S907: The AMF sends a session update session management context request (Nsmf_PDUSession_UpdateSMContext Request) to an SMF+PGW-C.

Optionally, in a roaming scenario, this step is performed by a V-SMF.

S908: An SMF+PWG-C and a UPF+PGW-U perform an N4 session modification procedure.

Further, in the handover execution phase, for example, in S907, after the SMF+PGW-C receives the request from the AMF, the SMF+PGW-C initiates a registration procedure to an HSS+UDM. In this case, the HSS+UDM provides service detection information {NEF+SCEF ID/NEF ID, reference ID, and service information} to an SMF+UDM based on local event information. The SMF sends service information to a UPF in S908, so that the UPF reports occurrence of a specific event to the SMF.

S909: The SMF+PWG-C and a PCF perform an SM policy association modification procedure (SMF initiated SM policy association modification).

This step is optional.

S910: The SMF+PWG-C sends a session update session management context response (Nsmf_PDUSession_UpdateSMContext) to the AMF.

Optionally, in the roaming scenario, this step is performed by the V-SMF.

S911: In the roaming scenario, the V-SMF and a V-UPF perform the N4 session modification procedure.

S912: The UE initiates a mobility registration procedure (EPS to 5GS mobility registration procedure) to a network.

In S912 in the handover execution phase, the UE performs the mobility registration procedure. During performing the mobility registration procedure, the HSS+UDM provides corresponding event information to the AMF based on that an accessed network is 5G. The AMF always uses the event information provided by the HSS+UDM. Specifically, local event information is updated based on the information provided by the HSS+UDM, and event information corresponding to a first-type terminal event in event information received from the MME is deleted. For descriptions of the event information, refer to the embodiment shown in FIG. 5.

The foregoing example is still used. In this procedure, the AMF obtains event information {Event type, Reference ID 1, NEF+SCEF ID, Indication}, {Event type, Reference ID 2, NEF+SCEF ID}, {Event type, Reference ID 3, NEF+SCEF ID}, or {Event type, Reference ID 1, NEF+SCEF ID}, {Event type, Reference ID 2, NEF+SCEF ID, Indication}, and {Event type, Reference ID 3, NEF+SCEF ID, Indication} from a UDM.

S913: The MME releases a resource in an EPC (resource clean up in EPC by MME).

In this embodiment, when handover is performed from the 4G system to the 5G system, the mobility management function entity may obtain first event information from the unified data management function entity, or the mobility management function entity obtains one or more pieces of second event information from a mobility management function entity in a communications system before the handover, receives the first event information from the same data management function entity, and deletes second event information corresponding to the first-type terminal event in the one or more pieces of second event information. Therefore, the mobility management function entity may obtain the event information in a timely manner, activate the terminal event based on the event information, and when a terminal apparatus is reachable, send, in a timely manner, a terminal event report to an application function entity that subscribes to the terminal event.

Figure 10A:
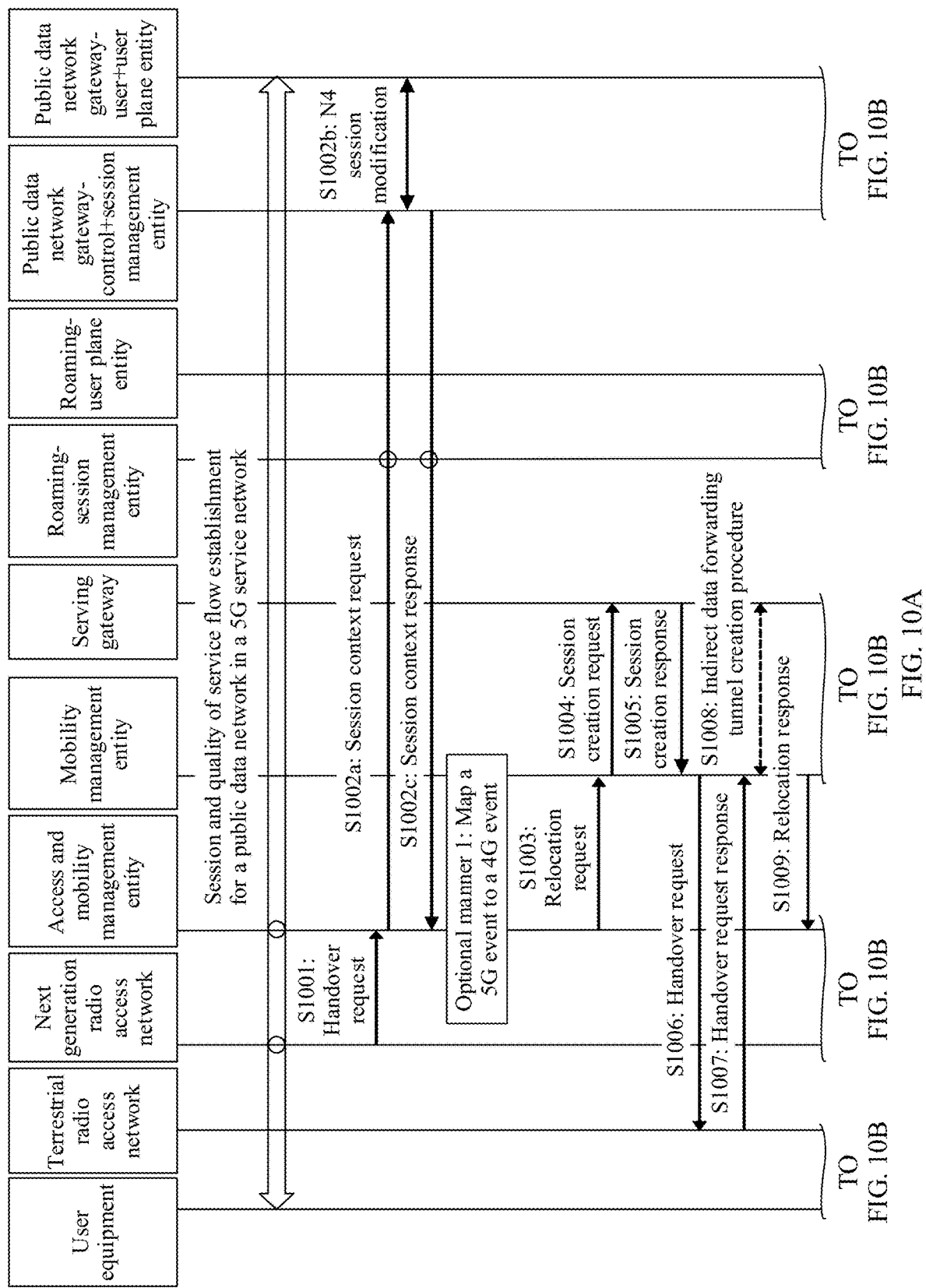
Figure 10B:
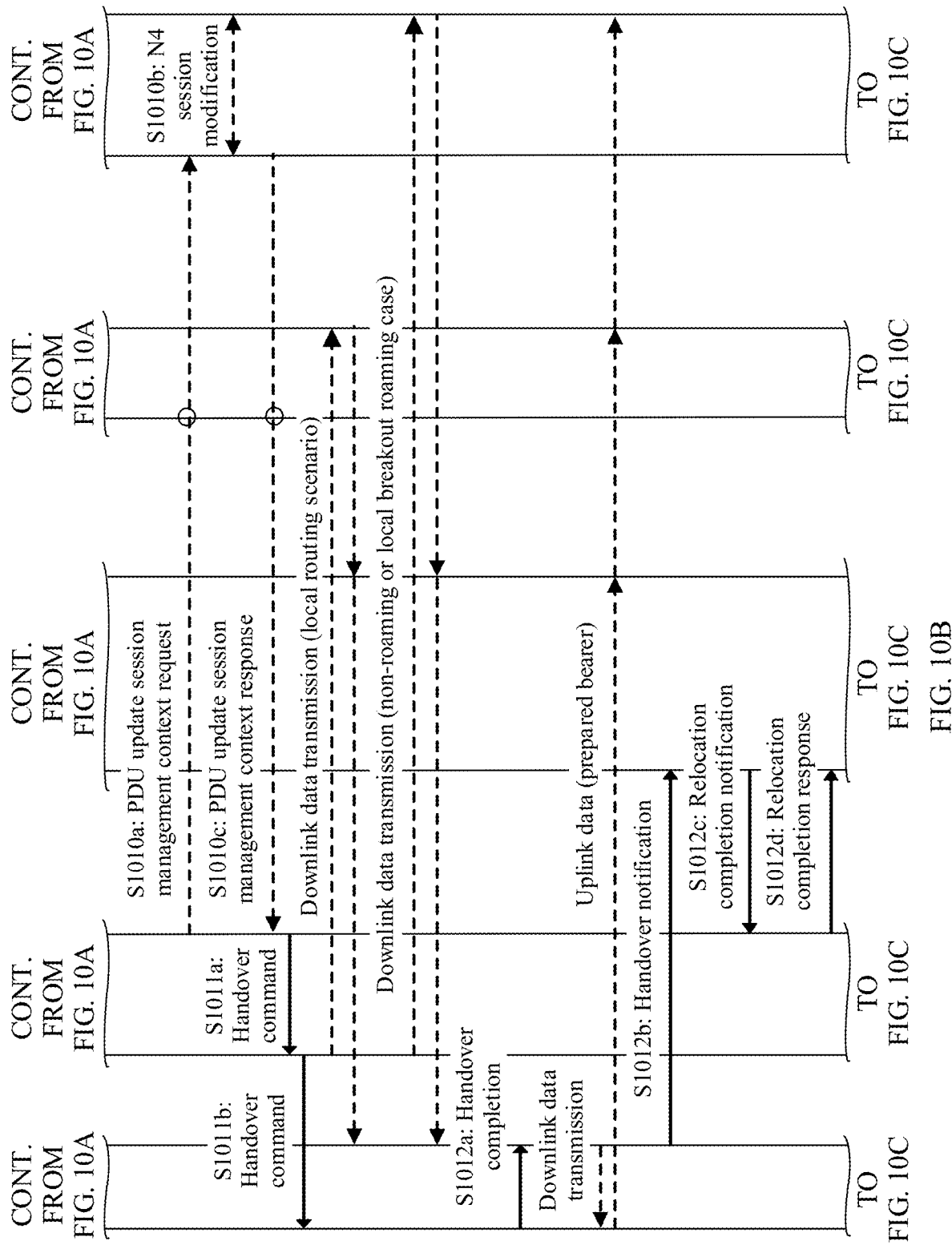
Figure 10C:
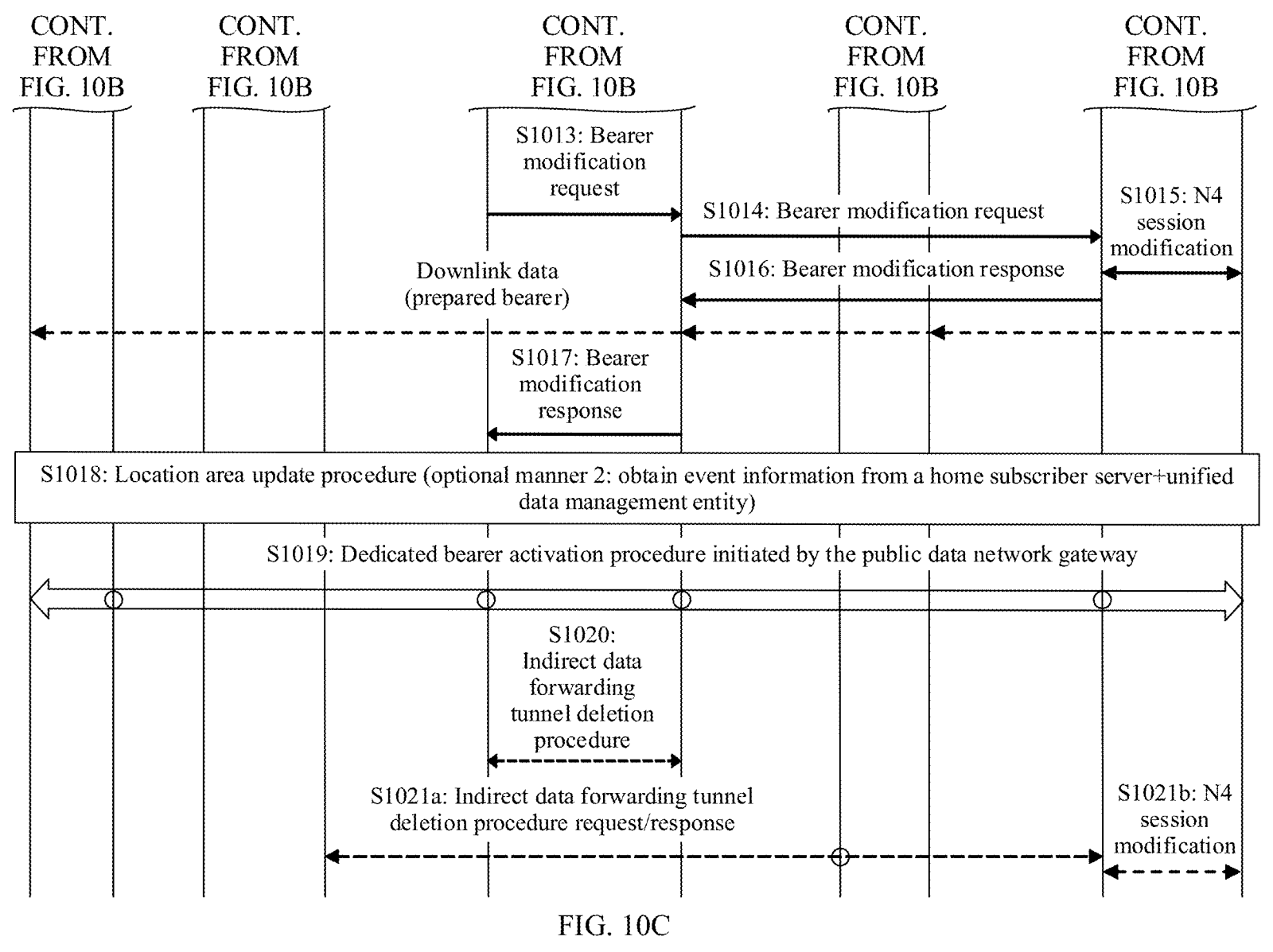

FIG. 10A, FIG. 10B, and FIG. 10C are a schematic flowchart of an example of obtaining event information during handover from 5G to 4G. A specific procedure is as follows:

S1001: An NG-RAN sends a handover request to an AMF.

S1002a: The AMF sends a session context request (Nsmf_PDUSession_Context Request) to a PGW-C+SMF.

S1002b: The PGW-C+SMF and a PGW-U+UPF perform N4 session modification.

S1002c: The PGW-C+SMF sends a session context response (Nsmf_PDUSession_Context Response) to the AMF.

Optionally, in a roaming scenario, the AMF performs the procedure with an H-SMF through a V-SMF.

S1003: The AMF maps an event to an event used by an MME, and sends a relocation request including the event to the MME.

The AMF performs event mapping, that is, maps the event to event information that can be identified by the MME, that is, event information that does not include an indication. After receiving the handover request from the NG-RAN, the AMF performs the event mapping. For example, event information {Event type, Reference ID 1, NEF+SCEF ID, Indication}, {Event type, Reference ID 2, NEF+SCEF ID}, {Event type, Reference ID 3, NEF+SCEF ID}, or {Event type, Reference ID 1, NEF+SCEF ID}, {Event type, Reference ID 2, NEF+SCEF ID, Indication}, and {Event type, Reference ID 3, NEF+SCEF ID, Indication} is mapped to: {Event type, Reference ID 1, NEF+SCEF ID}, {Event type, Reference ID 2, NEF+SCEF ID}, and {Event type, Reference ID 2, NEF+SCEF ID}.

This is an optional manner 1 in which the MME obtains the event information.

S1004: The MME sends a session creation request (create session request) to an SGW.

S1005: The SGW sends a session creation response (create session response) to the MME.

S1006: The MME sends a handover request to an E-UTRAN.

S1007: The E-UTRAN sends a handover request response (handover request ack) to the MME.

S1008: The MME and the SGW perform an indirect data forwarding tunnel (create indirect data forwarding tunnel request/response) creation procedure.

This step is optional.

S1009: The MME sends a relocation response to the AMF.

S1010a to S1010c: The AMF and the PGW-C+SMF perform a PDU update session management context (Nsmf_PDU_UpdateSMContext) procedure.

This step is optional.

S1011a: The AMF sends a handover command to the NG-RAN.

S1011b: The NG-RAN sends the handover command to UE.

S1012a: The UE sends a handover completion (handover complete) to the NG-RAN.

S1012b: The NG-RAN sends a handover notification (handover notify) to the MME.

S1012c and S1012d: The MME and the AMF perform relocation completion notification (relocation complete notification).

S1013: The MME sends a bearer modification request (modify bearer request) to the SGW.

S1014: The SGW sends the bearer modification request to the PGW-C+SMF.

S1015: The PGW-C+SMF and the UPF perform the N4 session modification (N4 session modification) procedure.

S1016: The PGW-C+SMF sends a bearer modification response (modify bearer response) to the SGW.

S1017: The SGW sends the bearer modification response to the MME.

S1018: The UE performs a location area update procedure (TAU procedure) with an EPC network.

Optionally, in this procedure, the MME obtains the event information from an HSS+UDM.

During the TAU procedure in the handover process, the HSS+UDM provides corresponding event information to the MME based on that an accessed network is 4G. The MME always uses the event information of the HSS+UDM. Specifically, local event information is updated based on the information provided by the HSS+UDM, or the event information received from the MME is deleted. For descriptions of the event information, refer to the embodiment shown in FIG. 5.

This is an optional manner 2 in which the MME obtains the event information.

S1019: The PGW-C+SMF initiates a dedicated bearer activation procedure (PGW initiated dedicated bearer activation) to the SGW, the MME, and the UE.

S1020: The SGW and the MME perform an indirect data forwarding tunnel deletion procedure (delete indirect data forwarding tunnel request/response).

S1021a: The AMF and the PGW-C+SMF perform the indirect data forwarding tunnel deletion procedure.

Optionally, in the roaming scenario, this step is performed by the V-SMF.

S1021b: Perform N4 session modification.

In this embodiment, when handover is performed from 5G to 4G, a mobility management function entity in a communications system before the handover may obtain second event information based on first event information, and send the second event information to a mobility management function entity in a communications system after the handover, to adapt to a mobility management function entity that does not change.

Figure 11:
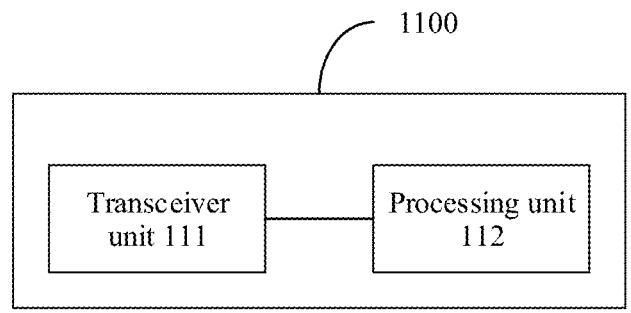
FIG. 11 is a schematic structural diagram of a module of a communications apparatus according to an embodiment of this application.

The following describes an apparatus 1100 provided in an embodiment of this application. Details are shown in FIG. 11.

The apparatus 1100 includes a transceiver unit 111 and a processing unit 112. The transceiver unit 111 is connected to the processing unit 112.

The transceiver unit 111 is configured to receive first event information from a unified data management function entity, where the first event information is used to indicate a first-type terminal event, the first event information includes an event association identifier, and the event association identifier is used to identify context information of the terminal event, or the event association identifier is used to identify the terminal event report.

The transceiver unit 111 is further configured to receive a service transmission notification from a session management function entity.

The processing unit 112 is configured to: when a terminal apparatus is unreachable, activate the first-type terminal event based on the first event information.

The transceiver unit 111 is further configured to: when the terminal apparatus is reachable, send the terminal event report to an application function entity that subscribes to the first-type terminal event.

Optionally, the transceiver unit 111 is further configured to: after the terminal apparatus is handed over to a communications system, receive the first event information from the unified data management function entity.

Optionally, the transceiver unit 111 is further configured to: after the terminal is handed over to a communications system, receive one or more pieces of the second event information from a second mobility management entity, where the second event information does not include the indication information.

The transceiver unit 111 is further configured to receive the first event information from the unified data management function entity.

The processing unit 112 is further configured to delete, based on the first event information, second event information corresponding to the first-type terminal event in the one or more pieces of second event information.

Optionally, the processing unit 112 is further configured to: when the terminal is handed over to a communications system, obtain second event information based on the first event information, where the second event information does not include the indication information.

The transceiver unit 111 is further configured to send the second event information to a second mobility management entity.

The apparatus 1100 may be a network apparatus, for example, may be a first mobility management function entity or a chip in a first mobility management function entity. The apparatus 1100 may implement other functions of the first mobility management function entity in the embodiments of this application through the transceiver unit 111 and the processing unit 112. For details, refer to related content in the embodiments shown in FIG. 5 and FIG. 8.

Figure 12:
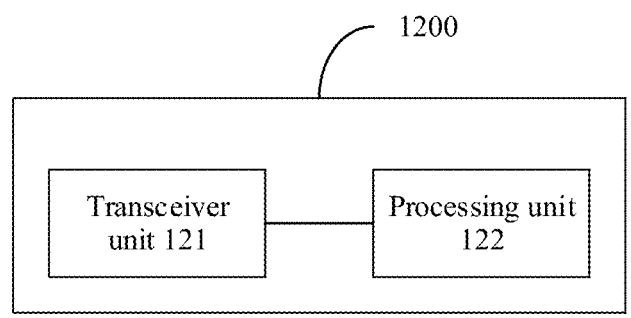
FIG. 12 is a schematic structural diagram of a module of another communications apparatus according to an embodiment of this application.

The following describes an apparatus 1200 provided in an embodiment of this application. Details are shown in FIG. 12.

The apparatus 1200 includes a transceiver unit 121 and a processing unit 122. The transceiver unit 121 is connected to the processing unit 122.

The transceiver unit 121 is configured to receive third event information from a control function entity, where the third event information includes an event association identifier, the event association identifier is used to identify context information of the terminal event, or the event association identifier is used to identify the terminal event report, and when the terminal event is a first-type terminal event, the third event information further includes service description information.

The processing unit 122 is configured to obtain first event information based on the third event information, where the first event information is used to indicate the first-type terminal event or a non-first-type terminal event, and the first event information includes the event association identifier.

The transceiver unit 121 is further configured to: when a terminal apparatus accesses a first communications system, send the first event information to a first mobility management function entity, where the first event information is used to activate the first-type terminal event.

In an implementation, the first event information further includes indication information, and the indication information is used to indicate the first-type terminal event.

In another implementation, the transceiver unit 121 is further configured to: when the terminal apparatus is handed over to a second communications system, send second event information to a second mobility management function entity, where the second event information does not include the indication information, and the second event information is used to activate all terminal events.

The transceiver unit 121 is further configured to: after the terminal is handed over from the second communications system to the first communications system, send the first event information to the first mobility management function entity.

The transceiver unit 121 is further configured to: after the terminal is handed over from the first communications system to the second communications system, send the second event information to the second mobility management function entity.

The apparatus 1200 may be a network apparatus, for example, may be a unified data management function entity or a chip in a unified data management function entity. For details, refer to related content in the embodiments shown in FIG. 5 and FIG. 8. Details are not described herein again.

Figure 13:
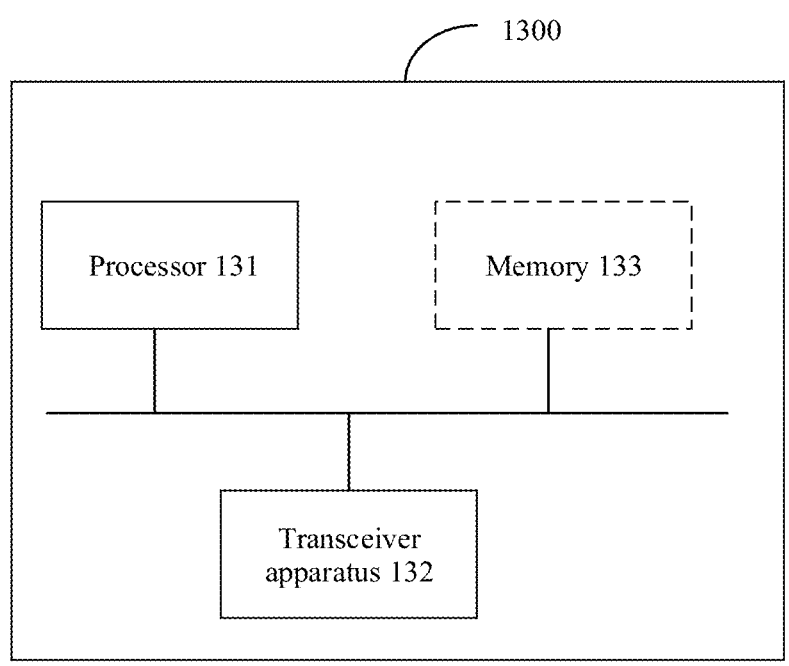
FIG. 13 is a schematic diagram of a hardware structure of a communications apparatus according to an embodiment of this application.

The following describes an apparatus provided in an embodiment of this application. Details are shown in FIG. 13.

The apparatus includes a processor 131 and a transceiver apparatus 132. Optionally, the apparatus further includes a memory 133. The processing unit 131, the transceiver unit 132, and the memory 133 are connected by using a communications bus.

The transceiver apparatus 132 may be an apparatus that has a transceiver function, and is configured to communicate with another network device or a communications network. The transceiver apparatus may be an independent sending unit and an independent receiving unit, or may be an entire transceiver apparatus. The transceiver apparatus may also be referred to as a communications unit.

The memory 133 may include one or more memories. The memory may be a component configured to store a program or data in one or more devices or circuits.

The memory 133 may exist independently, and is connected to the processor 131 by using the communications bus. Alternatively, the memory may be integrated with the processor 131.

The apparatus 1300 may be used in a network device, a circuit, a hardware component, or a chip.

In an embodiment, the apparatus 1300 may be a first mobility management function entity or a chip in a first mobility management function entity in the embodiments of this application. When the apparatus 1300 is a terminal, a chip in a terminal, the first mobility management function entity, or the chip in the first mobility management function entity in the embodiments of this application, the apparatus 1300 may implement the methods performed by the first mobility management function entity in the embodiments shown in FIG. 5 and FIG. 8.

Specifically, the processor is configured to perform the following steps:
controlling the transceiver apparatus to receive first event information from a unified data management function entity, where the first event information is used to indicate a first-type terminal event, the first event information includes an event association identifier, and the event association identifier is used to identify context information of the terminal event, or the event association identifier is used to identify the terminal event report;
controlling the transceiver apparatus to receive a service transmission notification from a session management function entity;
when a terminal apparatus is unreachable, activating the first-type terminal event based on the first event information; and
when the terminal apparatus is reachable, controlling the transceiver apparatus to send the terminal event report to an application function entity that subscribes to the first-type terminal event.

Optionally, the first event information further includes indication information, and the indication information is used to indicate the first-type terminal event.

Optionally, the processor further performs the following step: after the terminal apparatus is handed over to a communications system, controlling the transceiver apparatus to receive the first event information from the unified data management function entity.

Optionally, the processor further performs the following steps: after the terminal is handed over to a communications system, controlling the transceiver apparatus to receive one or more pieces of the second event information from a second mobility management entity, where the second event information does not include the indication information;

controlling the transceiver apparatus to receive the first event information from the unified data management function entity; and deleting, based on the first event information, second event information corresponding to the first-type terminal event in the one or more pieces of second event information.

Optionally, the processor further performs the following steps: when the terminal is handed over to a communications system, obtaining second event information based on the first event information, where the second event information does not include the indication information; and controlling the transceiver apparatus to send the second event information to a second mobility management entity.

Optionally, the indication information includes a data network name and/or slice information.

Optionally, the first-type terminal event is an enhanced terminal event, or the first-type terminal event is a non-enhanced terminal event.

In another embodiment, the apparatus 1300 may be a unified data management function entity or a chip in a unified data management function entity in the embodiments of this application. When the apparatus 1300 is a terminal, a chip in a terminal, the unified data management function entity, or the chip in the unified data management function entity in the embodiments of this application, the apparatus 1300 may implement the methods performed by the unified data management function entity in the embodiments shown in FIG. 5 and FIG. 8.

Specifically, the processor is configured to perform the following steps:

controlling the transceiver apparatus to receive third event information from a control function entity, where the third event information includes an event association identifier, the event association identifier is used to identify context information of the terminal event, or the event association identifier is used to identify the terminal event report, and when the terminal event is a first-type terminal event, the third event information further includes service description information;

obtaining first event information based on the third event information, where the first event information is used to indicate the first-type terminal event or a non-first-type terminal event, and the first event information includes the event association identifier; and when a terminal apparatus accesses a first communications system, controlling the transceiver apparatus to send the first event information to a first mobility management function entity, where the first event information is used to activate the first-type terminal event.

Optionally, the first event information further includes indication information, and the indication information is used to indicate the first-type terminal event.

Optionally, the processor further performs the following step: when the terminal apparatus is handed over to a second communications system, controlling the transceiver apparatus to send second event information to a second mobility management function entity, where the second event information does not include the indication information, and the second event information is used to activate all terminal events.

Optionally, the processor further performs the following step: after the terminal is handed over from the second communications system to the first communications system, controlling the transceiver apparatus to send the first event information to the first mobility management function entity.

Optionally, the processor further performs the following step: after the terminal is handed over from the first communications system to the second communications system, controlling the transceiver apparatus to send the second event information to the second mobility management function entity.

An embodiment of this application further provides a computer-readable storage medium. The methods described in the foregoing embodiments may be all or partially implemented by using software, hardware, firmware, or any combination thereof. If the methods are implemented in the software, functions used as one or more instructions or code may be stored in the computer-readable medium or transmitted on the computer-readable medium. The computer-readable medium may include a computer storage medium and a communications medium, and may further include any medium that can transfer a computer program from one place to another. The storage medium may be any available medium accessible to a computer.

In an optional design, the computer-readable medium may include a random access memory (RAM), a read-only memory (rROM), an electrically erasable programmable read-only memory (EEPROM), a compact disc read-only memory (CD-ROM), or another optical disc memory, a magnetic disk memory, or another magnetic storage device, or any other medium that can be used to carry or store required program code in a form of instructions or a data structure and is accessible to the computer. In addition, any connection is appropriately referred to as a computer-readable medium. For example, if a coaxial cable, an optical fiber cable, a twisted pair, a digital subscriber line (DSL), or a wireless technology (such as infrared, radio, and a microwave) is used to transmit software from a website, a server, or another remote source, the coaxial cable, the optical fiber cable, the twisted pair, the DSL, or the wireless technology such as infrared, radio, and a microwave is included in a definition of the medium. Magnetic disks and optical discs used in this specification include a compact disc (CD), a laser disc, an optical disc, a digital versatile disc (DVD), a floppy disk, and a Blu-ray disc. The magnetic disks usually magnetically reproduce data, and the optical discs optically reproduce data by using laser light. The foregoing combinations should also be included within the scope of the computer-readable medium.

An embodiment of this application further provides a computer program product. The methods described in the foregoing embodiments may be all or partially implemented by using software, hardware, firmware, or any combination thereof. When the methods are implemented in the software, the methods may be all or partially implemented in a form of the computer program product. The computer program product includes one or more computer instructions. When the foregoing computer program instructions are loaded and executed on a computer, all or some of the procedures or functions described in the foregoing method embodiments are generated. The computer may be a general-purpose computer, a special-purpose computer, a computer network, a network device, user equipment, or another programmable apparatus.

The objectives, technical solutions, and benefits of this application are further described in detail in the foregoing specific implementations. It should be understood that the foregoing descriptions are merely the specific implementations of this application, but are not intended to limit the protection scope of this application. Any modification, equivalent replacement or improvement made based on the technical solutions of this application shall fall within the protection scope of this application.

What is claimed is:

1. A communication method comprising:
receiving, by a first mobility management entity, first event information from a unified data management function entity,
wherein the first event information indicates a first-type terminal event to be either an enhanced terminal event or a non-enhanced terminal event,
wherein the first event information comprises indication information that indicates the first-type terminal event,
wherein each of the enhanced or non-enhanced terminal events is based on an application function (AF) entity sending a terminal event subscription request to a network,
wherein the terminal event subscription request for the enhanced terminal event includes service description information, and
wherein the terminal event subscription request for the non-enhanced terminal event does not include service description information;
receiving, by the first mobility management entity, a service transmission notification from a session management function entity;
activating, by the first mobility management entity, the first-type terminal event based on the first event information in response to a terminal apparatus being unreachable;
sending, by the first mobility management entity, the terminal event report to an application function entity that subscribes to the first-type terminal event in response to the terminal apparatus being reachable;
receiving, by the first mobility management entity, second event information based on the first event information in response to the terminal being handed over to a communications system, wherein the second event information does not comprise the indication information; and
based on the first event information, deleting, by the first mobility management entity, information in the second event information associated with the first-type terminal event.

2. The method according to claim 1, further comprising receiving, by the first mobility management entity, the first event information from the unified data management function entity after the terminal apparatus is handed over to a communications system.

3. The method according to claim 1, further comprising sending, by the first mobility management entity, the second event information to a second mobility management entity.

4. The method according to claim 1, wherein the indication information comprises a data network name and/or slice information.

5. The method according to claim 1, further comprising sending, by the unified data management function entity, the first event information to the first mobility management entity.

6. The method according to claim 1, wherein the first event information comprises an event association identifier for identifying either context information of a terminal event or a terminal event report.

7. A first mobility management entity comprising:
a processor; and
a memory coupled to the processor, wherein the memory comprises instructions that, when executed by the processor, cause the terminal apparatus to perform operations comprising:
receiving first event information from a unified data management function entity,
wherein the first event information indicates a first-type terminal event to be either an enhanced terminal event or a non-enhanced terminal event,
wherein the first event information comprises indication information that indicates the first-type terminal event,
wherein each of the enhanced or non-enhanced terminal events is based on an application function (AF) entity sending a terminal event subscription request to a network,
wherein the terminal event subscription request for the enhanced terminal event includes service description information, and
wherein the terminal event subscription request for the non-enhanced terminal event does not include service description information;
receiving a service transmission notification from a session management function entity;
activating the first-type terminal event based on the first event information when a terminal apparatus is unreachable;
sending the terminal event report to an application function entity that subscribes to the first-type terminal event when the terminal apparatus is reachable;
receiving second event information based on the first event information in response to the terminal being handed over to a communications system, wherein the second event information does not comprise the indication information; and
based on the first event information, deleting information in the second event information associated with the first-type terminal event.

8. The first mobility management entity according to claim 7, wherein the operations further comprise receiving the first event information from the unified data management function entity after the terminal apparatus is handed over to a communications system.

9. The first mobility management entity according to claim 7, wherein the operations further comprise sending the second event information to a second mobility management entity.

10. The first mobility management entity according to claim 7, wherein the indication information comprises a data network name and/or slice information.

11. The first mobility management entity according to claim 7, wherein the first event information comprises an event association identifier for identifying either context information of a terminal event or a terminal event report.

12. A unified data management function entity comprising:
a processor; and
a memory coupled to the processor, wherein the memory comprises instructions that, when executed by the processor, cause the unified data management function entity to perform operations comprising:
receiving third event information from a control function entity, wherein the third event information further comprises service description information when a terminal event is a first-type terminal event;

obtaining first event information based on the third event information, wherein the first event information indicates whether the first-type terminal event is either an enhanced terminal event or a non-enhanced terminal event,
- wherein each of the enhanced or non-enhanced terminal events is based on an application function (AF) entity sending a terminal event subscription request to a network,
- wherein the terminal event subscription request for the enhanced terminal event includes service description information, and
- wherein the terminal event subscription request for the non-enhanced terminal event does not include service description information;

sending the first event information to a first mobility management function entity when a terminal apparatus accesses a first communications system,
- wherein the first event information is used to activate the first-type terminal event or the non-first-type terminal event; and sending a second event information to a second mobility management function entity after the terminal is handed over from the first communications system to a second communications system.

13. The unified data management function entity according to claim 12, wherein the second event information does not comprise the indication information, and wherein the second event information is used to activate all terminal events.

14. The unified data management function entity according to claim 13, wherein the operations further comprise:
sending the first event information to the first mobility management function entity after the terminal is handed over from the second communications system to the first communications system.

15. The unified data management function entity according to claim 12, wherein the third event information comprises an event association identifier for identifying either context information of the terminal event or a terminal event report, and wherein the first event information comprises the event association identifier.

* * * * *